United States Patent
Tseng et al.

(10) Patent No.: US 12,231,975 B2
(45) Date of Patent: Feb. 18, 2025

(54) USER EQUIPMENT AND METHOD FOR SIDELINK FAILURE MANAGEMENT

(71) Applicant: SHARP KABUSHIKI KAISHA, Sakai (JP)

(72) Inventors: Yung-Lan Tseng, Taipei (TW); Hung-Chen Chen, Taipei (TW); Mei-Ju Shih, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 50 days.

(21) Appl. No.: 17/977,110

(22) Filed: Oct. 31, 2022

(65) Prior Publication Data

US 2023/0066281 A1    Mar. 2, 2023

Related U.S. Application Data

(63) Continuation of application No. 17/227,360, filed on Apr. 11, 2021, now Pat. No. 11,589,277.

(Continued)

(51) Int. Cl.
| | |
|---|---|
| H04W 36/00 | (2009.01) |
| H04W 4/40 | (2018.01) |
| H04W 76/11 | (2018.01) |
| H04W 76/18 | (2018.01) |
| H04W 76/23 | (2018.01) |
| H04W 76/27 | (2018.01) |
| H04W 92/18 | (2009.01) |

(52) U.S. Cl.
CPC ......... *H04W 36/0079* (2018.08); *H04W 4/40* (2018.02); *H04W 36/03* (2018.08); *H04W 76/11* (2018.02); *H04W 76/18* (2018.02); *H04W 76/23* (2018.02); *H04W 76/27* (2018.02); *H04W 92/18* (2013.01)

(58) Field of Classification Search
CPC ..... H04W 76/14; H04W 76/19; H04W 92/18; H04W 4/40; H04W 76/18; H04W 76/23; H04W 4/46; H04W 36/0079; H04W 36/03; H04W 76/11; H04W 76/27; H04W 36/0009; H04W 36/08
See application file for complete search history.

(56) References Cited

U.S. PATENT DOCUMENTS

| | | |
|---|---|---|
| 10,575,224 B2 | 2/2020 | Belleschi et al. |
| 2017/0317740 A1 | 11/2017 | Basu Mallick et al. |

(Continued)

FOREIGN PATENT DOCUMENTS

| | | |
|---|---|---|
| CN | 107113916 A | 8/2017 |
| CN | 108605253 A | 9/2018 |
| WO | 2022126360 A1 | 6/2022 |

OTHER PUBLICATIONS

Notice of Allowance dated Jul. 29, 2022 for U.S. Appl. No. 17/227,360 which is the parent application of the instant application.

(Continued)

*Primary Examiner* — Nam T Huynh
(74) *Attorney, Agent, or Firm* — ScienBiziP, P.C.

(57) ABSTRACT

A user equipment (UE) and a method for sidelink failure management are provided. The method includes determining that a sidelink failure event associated with a paired sidelink destination UE has occurred and transmitting, to a first cell, a sidelink failure report indicating the sidelink failure event.

16 Claims, 9 Drawing Sheets

Related U.S. Application Data

(60) Provisional application No. 63/008,566, filed on Apr. 10, 2020.

(56) References Cited

U.S. PATENT DOCUMENTS

| | | |
|---|---|---|
| 2020/0154323 A1 | 5/2020 | Belleschi et al. |
| 2022/0117032 A1 | 4/2022 | Han et al. |
| 2022/0256635 A1* | 8/2022 | Bao .................. H04W 76/19 |
| 2022/0361069 A1* | 11/2022 | Zhang .............. H04W 36/0016 |
| 2022/0417777 A1* | 12/2022 | Orsino ................. H04W 76/19 |

OTHER PUBLICATIONS

Huawei et al: "Discussion on the NR sidelink failure cases", 3GPP Draft; R2-1915977, 3GPP TSG-RAN WG2 Meeting#108, Reno, USA, Nov. 18- 22, 2019 (Nov. 18, 2019).

Huawei et al. "Considerations on RLM for NR V2X unicast", R2-1907419, 3GPP TSG-RAN WG2 Meeting#106, Reno, USA, May 13-17, 2019 (May 17, 2019), section 2.

* cited by examiner

USER EQUIPMENT AND METHOD FOR SIDELINK FAILURE MANAGEMENT

CROSS-REFERENCE TO RELATED APPLICATION(S)

This application is a continuation application of U.S. patent application Ser. No. 17/227,360 filed on Apr. 11, 2021, which claims the benefit of and priority of provisional U.S. Patent Application Ser. No. 63/008,566, filed on Apr. 10, 2020. The contents of all above-named applications are fully incorporated herein by reference for all purposes.

FIELD

The present disclosure is related to wireless communication, and more particularly, to a method for sidelink failure management in cellular wireless communication networks.

BACKGROUND

Abbreviations used in this disclosure include:

| Abbreviation | Full name |
| --- | --- |
| 3GPP | 3$^{rd}$ Generation Partnership Project |
| 5G | 5$^{th}$ Generation |
| ACK | Acknowledgement |
| ARQ | Automatic Repeat Request |
| AS | Access Stratum |
| BS | Base Station |
| BSR | Buffer Status Report |
| BWP | Bandwidth Part |
| CA | Carrier Aggregation |
| CS-RNTI | Configured Scheduling RNTI |
| CSI | Channel State Information |
| CSI-RS | Channel State Information Reference Signal |
| DC | Dual Connectivity |
| DCI | Downlink Control Information |
| DL | Downlink |
| DRB | Data Radio Bearer |
| E-UTRA(N) | Evolved Universal Terrestrial Radio Access (Network) |
| EN-DC | E-UTRA NR Dual Connectivity |
| FR | Frequency Range |
| HARQ | Hybrid Automatic Repeat Request |
| ID | Identifier |
| IE | Information Element |
| LCH | Logical Channel |
| LCID | Logical Channel ID |
| LTE | Long Term Evolution |
| MAC | Medium Access Control |
| MAC CE | MAC Control Element |
| MCG | Master Cell Group |
| MIB | Master Information Block |
| MN | Master Node |
| NACK | Negative Acknowledgement |
| NAS | Non-Access Stratum |
| NE-DC | NR - E-UTRA Dual Connectivity |
| NR | New Radio |
| NW | Network |
| PCell | Primary Cell |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PHY | Physical (layer) |
| PLMN | Public Land Mobile Network |
| PRACH | Physical Random Access Channel |
| PUCCH | Physical Uplink Control Channel |
| PUSCH | Physical Uplink Shared Channel |
| Qos | Quality of Service |
| RA | Random Access |
| RAN | Radio Access Network |
| RAR | Random Access Response |
| RAT | Radio Access Technology |
| RF | Radio Frequency |
| RLC | Radio Link Control |
| RNTI | Radio Network Temporary Identifier |
| RRC | Radio Resource Control |
| RS | Reference Signal |
| RSRP | Reference Signal Received Power |
| Rx | Reception |
| SCCH | Sidelink Control Channel |
| SCell | Secondary Cell |
| SCG | Secondary Cell Group |
| SCS | Subcarrier Spacing |
| SDAP | Service Data Adaptation Protocol |
| SDU | Service Data Unit |
| SI | System Information |
| SIB | System Information Block |
| SL | Sidelink |
| SLRB | Sidelink Radio Bearer |
| SN | Secondary Node |
| SR | Scheduling Request |
| SRB | Signaling Radio Bearer |
| TS | Technical Specification |
| Tx | Transmission |
| UE | User Equipment |
| UL | Uplink |
| USIM | Universal Subscriber Identity Module |
| V2X | Vehicle-to-Everything |

Various efforts have been made to improve different aspects of wireless communication for cellular wireless communication systems, such as 5G NR by improving data rate, latency, reliability, and mobility. The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method performed by a UE in cellular wireless communication network for sidelink failure management.

According to an aspect of the present disclosure, a UE for sidelink failure management is provided. The UE includes at least one processor and one or more non-transitory computer-readable media storing computer-executable instructions that, when executed by the at least one processor, cause the UE to determine that a sidelink failure event associated with a paired sidelink destination UE has occurred and transmit, to a first cell, a sidelink failure report indicating the sidelink failure event.

According to another aspect of the present disclosure, a method for sidelink failure management performed by a UE is provided. The method includes determining that a sidelink failure event associated with a paired sidelink destination UE has occurred and transmitting, to a first cell, a sidelink failure report indicating the sidelink failure event.

BRIEF DESCRIPTION OF THE DRAWINGS

Aspects of the present disclosure are best understood from the following detailed description when read with the accompanying drawings. Various features are not drawn to scale. Dimensions of various features may be arbitrarily increased or reduced for clarity of discussion.

FIG. 1 illustrates a sidelink operation scenario within a cell according to an implementation of the present disclosure.

DESCRIPTION

Figure 1:
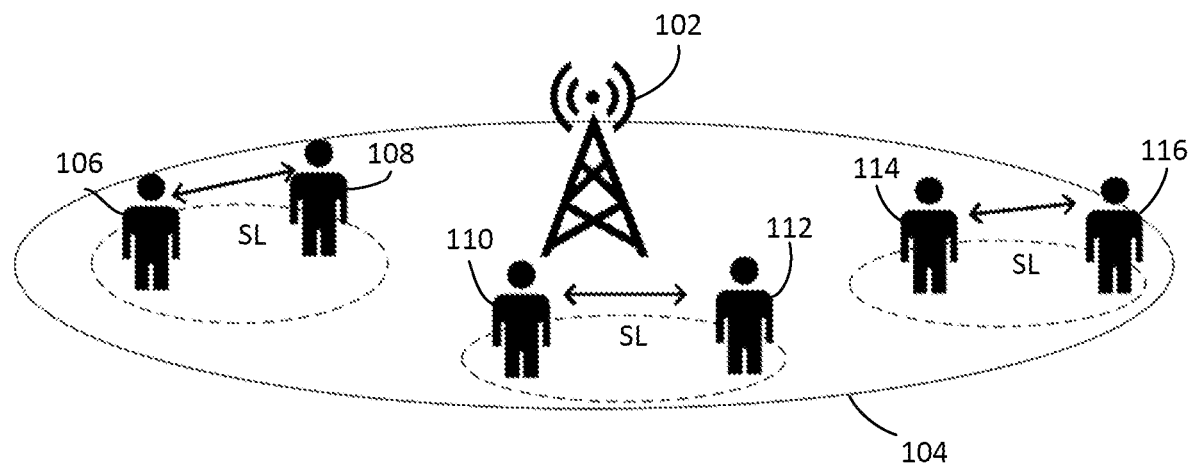

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one BS, at least one UE, and one or more optional network elements that provide connection within a network. The UE communicates with the network such as a Core Network (CN), an Evolved Packet Core (EPC) network, an Evolved Universal Terrestrial RAN (E-UTRA), a 5G Core (5GC), or an internet via a RAN established by one or more BSs.

A UE may include but is not limited to a mobile station, a mobile terminal or device, or a user communication radio terminal. The UE may be portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

A BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an E-UTRA BS in connection with 5GC, a next generation Node B (gNB) in the 5G-RAN, or any other apparatus capable of controlling radio communication and managing radio resources within a cell. The BS may serve one or more UEs via one or more radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) (e.g., (ProSe) direct communication services and (ProSe) direct discovery services) or V2X services (e.g., E-UTRA V2X sidelink communication services) or sidelink service (e.g., NR sidelink communication services). Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. Sidelink resources may also be provided in an NR frame to support ProSe services, V2X services (e.g., E-UTRA V2X sidelink communication services) or sidelink services (e.g., NR sidelink communication services). In contrast, sidelink resources may also be provided in an E-UTRA frame to support ProSe services, V2X services (e.g., E-UTRA V2X sidelink communication services) or sidelink services (e.g., NR sidelink communication services).

V2X Services & PC5 Interface

V2X (Vehicle-to-Everything) services are provided to support the information exchange between vehicles. In LTE protocols, V2X services may be supported in the air interface by Uu interface and PC5 interface. The PC5 interface covers the designs in Layer 2 and Layer 1. The airlink interface on the PC5 interface is also called sidelink in LTE protocols. The LTE network supports sidelink operations since Rel.12.

FIG. 1 illustrates a sidelink operation scenario 100 within a cell according to an implementation of the present disclosure. With sidelink (SL) operations, UEs 106, 108, 110, 112, 114 and 116 in the radio coverage 104 of BS 102 may exchange data and control signaling directly without the relaying of BS 102. The BS 102 may be an eNB in an LTE network or a gNB in an NR network. For the convenience of description, all the the UEs in the present disclosure may be capable and authorized to access V2X services and the PC5 interface with neighbor UEs and RAN.

The V2X services may be further categorized based on different cast-types in sidelink, such as:

Unicast: Only two UEs are in one sidelink group. Formulation of the sidelink group may be achieved in the NAS layer.

Multi-cast (Groupcast): More than two UEs are grouped in one sidelink group to exchange sidelink packets with all other members in the sidelink group.

In some implementations, sidelink groups may be formulated in the NAS layer (e.g., V2X application layer or PC5-S protocols) signaling, AS layer signaling in PC5 interface, (e.g., Sidelink RRC Layer signaling, PC5-RRC signaling), or AS layer signaling in Uu interface (e.g., RRC signaling, RRCReconfiguration message).

Broadcast: There may be no limitation to the sidelink group. A UE may be able to broadcast message(s) and its neighbor UE(s) within a sidelink communication range may receive and decode the broadcast message(s) successfully. In some implementations, the sidelink communication range may depend on transmission (Tx) power, hardware sensitivity, etc.

To enable sidelink operation under the coverage of RANs (e.g., E-UTRAN or NR-RAN), (LTE/NR) cells may provide SL (radio) configurations and SL (radio) resource allocation to UEs. UEs under the coverage of cellular networks may need to perform sidelink operations based on the (radio) configurations of serving RANs. To enable sidelink operation under the coverage of a RAN, the serving cell (or camped-on cells) may need to provide an SL (AS) configuration and SL resource allocation to UEs. To enable sidelink operation (e.g., E-UTRA V2X sidelink communication services or NR sidelink communication services), the UE may obtain sidelink (radio) configurations and/or sidelink (radio) resource allocation from a serving/camped cell(s) operating on one sidelink frequency carrier. In some additional implementations, the UE may obtain sidelink (radio) configurations and sidelink (radio) resource allocation from a non-serving cell in one sidelink frequency carrier. The sidelink frequency carriers are the frequency carriers which are defined/configured/enabled/allowed by network operators or service providers for UEs to implement sidelink data exchange with neighbor UEs directly.

In some implementations, the UE may obtain the locations of sidelink frequency carrier(s) in the frequency domain (e.g., Absolute Radio-Frequency Channel Number, ARFCN) based on sidelink pre-configuration (which may be pre-installed in USIM), broadcasting system information (e.g., SIB12, SIB13 in NR protocols) from the serving/camped/non-serving cell, sidelink control signaling exchange between UEs (e.g., PC5-RRC signaling or Sidelink-Master Information Blocks), or UE specific dedicated control signaling from the serving cell.

Two basic approaches are provided for SL resource allocation in the LTE V2X services:

Scheduled Resource Allocation, Characterized by:

The UE needs to be in the (LTE/NR) RRC CONNECTED state to transmit data.

The UE requests SL resources from the eNB (by sending a sidelink buffer status report to the serving cell). The eNB schedules dedicated sidelink resource for the UE to transmit sidelink control information and sidelink data. To achieve this, the eNB may request the UE to report a sidelink buffer status report (SL-BSR) through the Uu interface. In addition, the UE may also trigger a Scheduling Request (SR) on an uplink physical resource (e.g., a PUCCH) or initiate a random access procedure while the UE wants to transmit an SL-BSR to the eNB, but a valid uplink resource is absent. The SR resource (or configurations) and the SR procedure may be common for both sidelink operations and uplink traffic.

UE Autonomous Resource Selection from SL Resource Pools, Characterized by:

UE autonomous resource selection may be applied to both UEs in the RRC connected state (e.g., through dedicated RRC signaling or system information broadcast) and UEs in the RRC inactive/idle state (e.g., through system information broadcast).

A resource pool is a set of (virtually continuous) resource blocks and the UE may determine which physical (radio) resource blocks the UE wants to access for SL packet transmission autonomously.

The UE on its own selects resources from the (sidelink) resource pools and performs transport format selection to transmit sidelink control information and data.

The UE may perform (partial) sensing for (re)selection of sidelink resources before SL packet delivery. Based on (partial) sensing results, the UE (re)selects some specific sidelink resources and reserves multiple sidelink resources. Up to 2 parallel (independent) resource reservation processes are allowed to be performed by the UE. The UE is also allowed to perform a single resource selection for its V2X sidelink transmission.

When the UE is out of coverage on the frequency used for V2X sidelink communication and if the eNB does not provide a V2X sidelink configuration for the frequency, the UE may use a set of transmission and reception resource pools pre-configured in the UE (e.g., sidelink pre-configuration, which may be pre-installed in the memory module of the UE). V2X sidelink communication resources may not be shared with other non-V2X data transmitted over the sidelink. In some implementations, the UE may obtain the pre-configuration through an installed USIM, stored memory, or through RAN which the UE has previously accessed. Moreover, the UE may implement a (LTE/NR) PC5 interface by synchronizing with a Global Navigation Satellite System (GNSS) and applying a pre-configuration. In this condition, the PC5 interface may be independent of the RAN and (LTE/NR) Uu interface.

V2X Platoon Scenario

Figure 2:
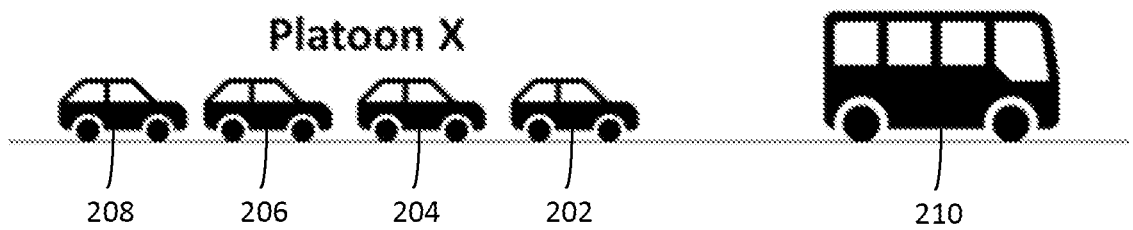
FIG. 2 illustrates a V2X platooning scenario according to an implementation of the present disclosure.

FIG. 2 illustrates a V2X platooning scenario 200 according to an implementation of the present disclosure. In the platooning scenario, platoon X may include several vehicles (or UEs) 202, 204, 206 and 208, where there may be (at least) one scheduler (e.g., vehicle 202) in platoon X. In addition, vehicle 210 may be a UE that is not included in platoon X. In platoon X, the scheduler (e.g., vehicle 202) may configure SL resources to members (e.g., vehicles 204, 206 and 208) in the same platoon X through the following approaches:

Mode 1 approach: the scheduler may configure dynamic sidelink grants to members in the same platoon (e.g., dynamic sidelink grant through sidelink control information). In addition, the scheduler may also configure a semi-periodic sidelink grant (e.g., configured sidelink grant) to the UE through sidelink control signals (e.g., through a Physical Sidelink Broadcast Channel, or sidelink PC5-RRC signaling). To achieve Mode 1-like approach, the scheduler may need UEs to provide feedback information through the (LTE/NR) PC5 interface.

Mode 2 approach: the scheduler may configure sidelink resource pools to members in the same platoon. The UEs may select sidelink grant by themselves automatically (e.g., sidelink grant selection with or without sensing). The platooning scenario may be applied when the vehicles of the platoon are in-coverage (i.e., all of the vehicles in the platoon are under the coverage of a cellular radio access network), out-of-coverage (i.e., all of the vehicles in the platoon are out of the coverage of a cellular radio access network), or partial in-coverage (i.e., some of the UEs in the platoon are in-coverage and the other UEs in the platoon are out-of-coverage of a cellular radio access network).

To support the scheduler, the members in the platoon, in the present disclosure, may need to support the following processes to report their own statuses to the scheduler through the PC5 interface:

Sidelink scheduling request (SL-SR) configuration & report

Sidelink buffer status report (SL-BSR) configuration & report

Sidelink power headroom report (SL-PHR) configuration & report

PC5-RRC Connection & Sidelink Radio Bearer

Figure 3:
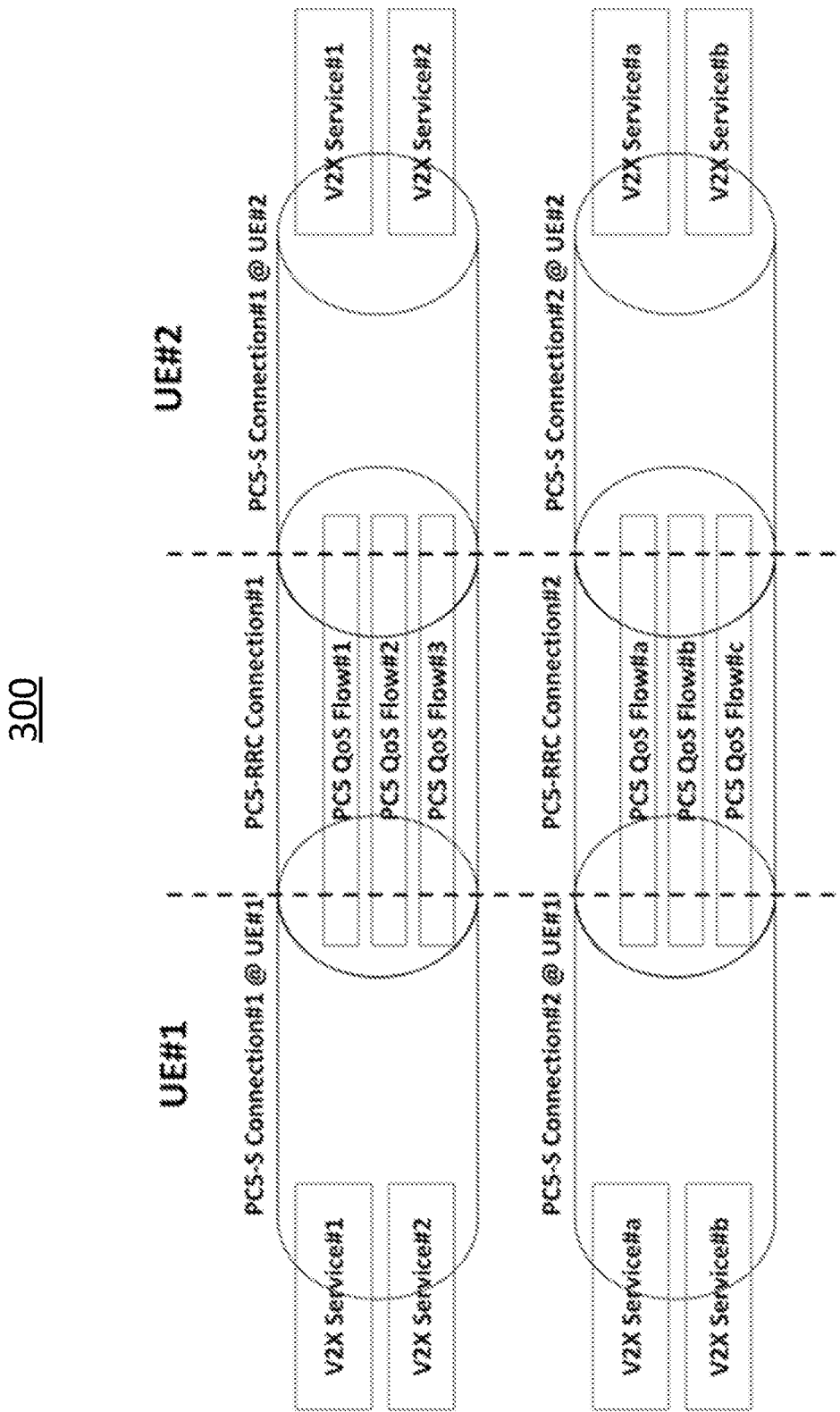
FIG. 3 illustrates PC5-RRC connections between a pair of UEs according to an implementation of the present disclosure.

FIG. 3 illustrates PC5-RRC connections 300 between a pair of UEs according to an implementation of the present disclosure. A pair of UEs may construct multiple PC5-RRC connections, where each PC5-RRC connection may support different sets of V2X service(s) with different (Layer-2/Layer-1) UE IDs and different QoS requirements.

The concept of PC5-RRC connection may be different from RRC Connection in the Uu interface. In the NR PC5 interface, one SL-unicast group (e.g., UE #1 and UE #2 in FIG. 3) may first need to build (at least) one PC5-S connection and each PC5-S connection may be associated with one PC5-RRC connection in the AS layer independently. In other words, the PC5-S connection and PC5-RRC connection may be a one-to-one mapping. Each PC5 RRC connection is a logical connection between a pair of source and destination (Layer-2) UE IDs. In the service level, one PC5-S connection (and so the associated PC5-RRC connection) may be built to serve one or more than one V2X service. For example, the PC5-S connection #1s at the UE #1 and UE #2 are constructed to serve V2X service #1/#2 and the PC5-S connection #2s are constructed to serve V2X service #a/#b. However, there may be multiple active PC5-S connections/PC5-RRC connections in the paired UEs to support different sets of V2X services that have different QoS requirements. In some implementations, the UE may report the status of PC5-RRC connections to the serving cell (e.g., a PCell in a master cell group or a PSCell in a secondary cell group) and the serving RAN may also know the conditions of PC5-RRC connections in the UE side. In addition, the UE may also report the sidelink radio link failure event (to at least one PC5-RRC connection) to the serving RAN (e.g., for sidelink resource management such as a Mode 1 sidelink resource configuration approach). In one implementation, one UE may join multiple SL-unicast groups with different target UEs and, therefore, one UE may have PC5-RRC connections associated with different UEs.

Sidelink Access Stratum Configuration Through Dedicated Control Signaling in a Uu Interface In Release-16, for a UE performing (LTE/NR) sidelink operation, sidelink AS configuration (e.g., SL-ConfigDedicatedNR/SL-ConfigDedicatedEUTRA in NR protocols or sl-ConfigDedicatedForNR/sl-V2X-ConfigDedicated in E-UTRA protocols) may be configured by a serving cell based on the received dedicated control signaling (e.g., RRC(Connection)Reconfiguration message of LTE/NR RRC protocols). In addition, an NR cell may configure a sidelink AS configuration for an LTE/NR PC5 interface (e.g., sl-ConfigDedicatedNR/sl-ConfigDedicatedEUTRA for the AS configuration of an NR PC5 interface/LTE PC5 interface respectively) in the RRC(Connection)Reconfiguration message. Similarly, one E-UTRA cell may also configure a sidelink AS configuration for an LTE/NR PC5 interface through the RRC(Connection)Reconfiguration message (e.g., by transmitting sl-ConfigDedicatedForNR/sl-V2X-ConfigDedicated in E-UTRA protocols to the UE). To the UE, the sidelink AS configuration includes the AS layer configuration for an LTE PC5 interface and/or an NR PC5 interface. The sidelink AS configuration transmitted via RRC signaling may also be referred to as a sidelink RRC configuration in the present disclosure.

Table 1 lists an example RRC(Connection)Reconfiguration message including a sidelink AS configuration.

TABLE 1

| RRCReconfiguration-v16xy-IEs ::= | SEQUENCE { |
|---|---|
| sl-ConfigDedicatedNR-r16 | SetupRelease {SL-ConfigDedicatedNR-r16} |
| OPTIONAL, -- Need M | |
| sl-ConfigDedicatedEUTRA-r16 | SetupRelease {SL-ConfigDedicatedEUTRA-r16} |
| OPTIONAL, -- Need M | |
| nonCriticalExtension | SEQUENCE { } |
| OPTIONAL | |
| } | |

The UE may receive the sidelink AS configuration of (LTE/NR) PC5 interface through the RRC(Connection)Reconfiguration message. After receiving the (LTE/NR) sidelink AS configuration from the serving cell, the UE may configure the AS layers of (LTE/NR) PC5 interface accordingly.

Sidelink AS Configuration Through System Information Broadcast

In some of the implementations, the UE may obtain the sidelink AS configuration for a (LTE/NR) PC5 interface by receiving broadcast control signaling from the serving cell (or from a non-serving cell while the cell is operating on a sidelink component carrier in which the UE has interest to operate a sidelink data exchange). In some implementations, the UE may obtain the sidelink AS configuration through an SI on-demand procedure.

Sidelink AS Configuration Through PC5 RRC Signaling

Figure 4A:
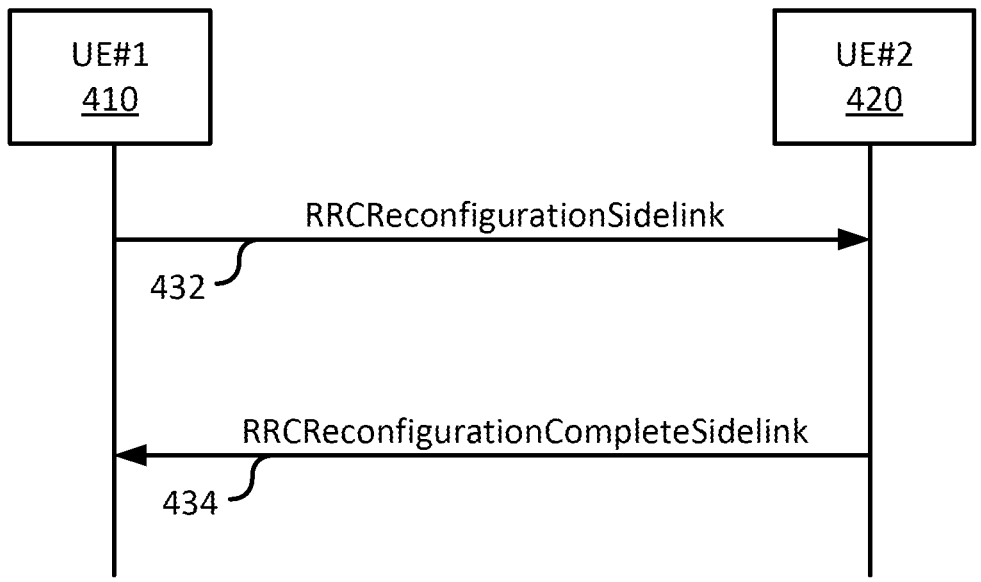
FIG. 4A illustrates a procedure for obtaining the sidelink AS configuration through PC5 RRC signaling according to an implementation of the present disclosure.

In comparison, in sidelink unicast service, the UE may obtain the sidelink AS configuration from a paired UE. FIG. 4A illustrates a procedure 400A for obtaining the sidelink AS configuration through PC5 RRC signaling according to an implementation of the present disclosure. {UE #1 410, UE #2 420} are formulated as a sidelink unicast group (e.g., by the V2X application layer). In addition, UE #1 410 and UE #2 420 may exchange PC5 RRC signaling. In action 432, UE #1 410 may provide a sidelink AS configuration to UE #2 420 by transmitting an RRCReconfigurationSidelink message to the UE #2 420. Then, UE #2 420 may configure its sidelink AS configuration (associated with UE #1 410) based on the received RRCReconfigurationSidelink message. UE #2 420 may reply by transmitting an RRCReconfigurationCompleteSidelink message to the UE #1 410 in action 434.

Figure 4B:
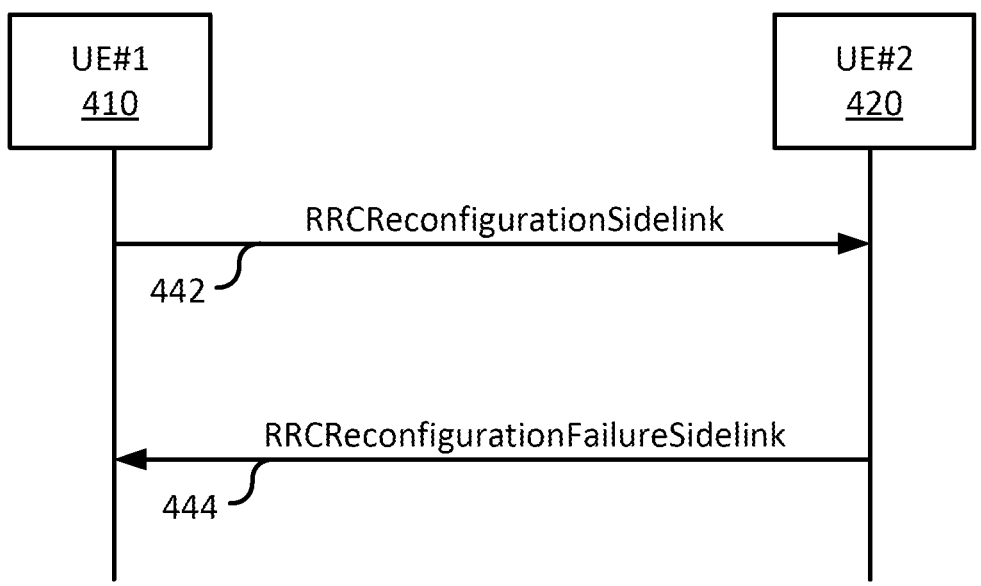
FIG. 4B illustrates a procedure for handling a sidelink AS configuration failure event according to an implementation of the present disclosure.

A sidelink AS configuration failure event (or sidelink RRC configuration failure event) may happen when UE #2 420 is unable to comply with (part of) the configuration included in the RRCReconfigurationSidelink message. FIG. 4B illustrates a procedure 400B for handling a sidelink AS configuration failure event according to an implementation of the present disclosure. In action 442, UE #1 410 may provide a sidelink AS configuration to UE #2 420 by transmitting an RRCReconfigurationSidelink message to the UE #2 420. UE #2 420 may perform at least one of the following actions when a sidelink AS configuration failure event occurs: continue using the stored sidelink AS configuration (associated with UE #1 410) used prior to the reception of the RRCReconfigurationSidelink message; and transmit an RRCReconfigurationFailureSidelink message to UE #1 410 in action 444

The sidelink AS configuration may cover the following settings:

Sidelink radio bearer configuration (e.g., to add/modify or release one (or more than one) sidelink radio bearer). In some of the implementations, the sidelink radio bearer configuration may include/cover the sidelink AS configuration of (at least) one radio bearer in the SDAP layer and PDCP layer. In addition, the 'transmission range of the SLRB' associated with one sidelink radio bearer may also be included in the sidelink radio bearer configuration. Each sidelink radio bearer may be associated with one sidelink radio bearer index. In some implementations, sidelink radio bearers and normal radio bearers may share the same index pool. In some implementation, there may be two index pools for each bearer index, e.g., one index pool for sidelink radio bearers and the other index pool for normal radio bearers.

Sidelink RLC bearer configuration (e.g., to add/modify or release one (or more than one) sidelink RLC radio bearer associated with one corresponding sidelink radio bearer index. In some of implementations, the sidelink RLC radio bearer configuration may include/cover the sidelink AS configuration of (at least) one radio bearer in the RLC (e.g., the ARQ mode) layer and/or MAC layer (e.g., the logical channel configuration associated with the RLC bearer).

Sidelink measurement configuration (e.g., the target of sidelink measurements, such as the SL-RSRP measurement and the configuration of a reporting event). In some implementations, both the Layer 1 SL-measurement configuration and Layer 3 SL-measurement configuration may be included in the sidelink measurement configuration.

Sidelink resource configuration (which may include/cover Mode 1 and/or Mode 2 sidelink resource configuration and/or Type 1/Type 2 sidelink configured grant configuration).

Radio resource on the Uu interface to support the sidelink operation (e.g., a PUCCH resource configuration to transmit sidelink HARQ responses or a PDCCH search space to receive DL control signaling for sidelink operation).

Sidelink frequency configuration (e.g., to add or to release one or (more than one) sidelink frequency component carrier).

Sidelink synchronization configuration (e.g., whether the UE is allowed to become a sidelink synchronization source and the corresponding configuration or the related configuration for one UE to transmit a Sidelink Synchronization Signal Burst Set and/or SL-MIB).

Sidelink BandwidthPart (SL-BWP) configuration.

Sidelink QoS profiles, which are used to give/set the QoS parameters for a sidelink QoS flow.

whether the UE is configured to report semi-persistent-scheduling (SPS) information for V2X sidelink communication (e.g., sl-AssistanceConfigEUTRA, which may be included in the OtherConfig in the RRC(Connection)Reconfiguration message).

whether the UE is configured to report NR sidelink configured grant assistance information for NR sidelink communication (e.g., sl-AssistanceConfigNR, which may be included in the OtherConfig in the RRC(Connection)Reconfiguration message).

The sl-AssistanceConfigEUTRA & sl-AssistanceConfigNR may be transmitted by a serving (NR/LTE) cell through the RRC(Connection)Reconfiguration message.

In some implementations, one sidelink AS configuration may be associated with one specific destination (Layer-2) UE ID in the AS layer of a (LTE/NR) PC5 interface. In some other implementations, one sidelink AS configuration may be associated with more than one specific destination ID in the AS layer. In some implementations, one sidelink AS configuration may be associated with all of the associated destination (UE) ID(s) at the UE side. For example, one common sidelink AS configuration may be transmitted through broadcast system information. Then, the UE may apply the common sidelink AS configuration to all of the associated destination ID(s).

In some implementations, the combination of sidelink AS configurations associated with one destination (UE) ID may depend on the case types (e.g., broadcast, group-cast, and uni-cast) associated with the destination ID. For example, one sidelink AS configuration may be associated with all associated destination ID(s) for a broadcast type. In some other conditions (e.g., for sidelink uni-cast type), each destination ID may be associated with one corresponding sidelink AS configuration.

The UE may derive the destination (Layer-2) ID through the input of upper layers. For example, when a UE is building the PC5 RRC connection with one target UE, the V2X layer of the UE side may generate a service-level destination (UE) ID associated with the target UE. Then, the service-level destination ID may be transmitted to the AS layer of the UE and the destination (Layer-2) ID may be generated in the AS layer to identify the target UE in the AS layer of the UE side.

The present disclosure is based on V2X services. However, the proposals and proposed implementations may also be applied to other services implemented on the (LTE/NR) sidelink services implemented on the (LTE/NR) PC5 interface and (LTE/NR) sidelink operation.

Problem Formulation

As illustrated in FIG. 4B, a sidelink AS configuration failure event may occur when UE #2 420 receives the sidelink AS configuration through PC5 RRC signaling. In the NR PC5 interface, UE #2 420 may release the PC5 RRC connection with UE #1 410 if the sidelink AS configuration failure event occurs after receiving the RRCReconfigurationSidelink message from UE #1 410 (or UE #2 420 may just release the 'failed' sidelink radio bearers indicated in the RRCReconfigurationSidelink message).

Observation #1: However, more UE behavior may be needed to address a sidelink RRC reconfiguration failure event between the Tx UE and Rx UE of the RRCReconfigurationFailureSidelink message.

Table 2 illustrates an example UE behavior upon a sidelink RRC reconfiguration failure event.

TABLE 2

The UE shall perform the following actions upon reception of the RRCReconfigurationFailureSidelink:
1>     stop timer T400, if running;
2>     continue using the configuration used prior to corresponding RRCReconfigurationSidelink message;
1>    if UE is in RRC_CONNECTED:
   2>     perform the sidelink UE information for NR sidelink communication procedure.
(e.g., as specified in in TS 36.331)

Observation #2: In addition, in the latest specification, the signaling content is still absent, with further signaling needed to resolve the reconfiguration failure event.

Table 3 illustrates an example RRCReconfigurationFailureSidelink message.

TABLE 3

The RRCReconfigurationFailureSidelink message is used to indicate the failure of a PC5 RRC AS reconfiguration. It is only applied to a unicast of NR sidelink communication.
   Signaling radio bearer: Sidelink SRB for PC5-RRC
   RLC-SAP: AM
   Logical channel: SCCH
   Direction: UE to UE TABLE 3-continued

```
-- ASN1START
-- TAG-RRCRECONFIGURATIONFAILURESIDELINK-START
RRCReconfigurationFailureSidelink ::=      SEQUENCE {
    rrc-TransactionIdentifier-r16              RRC-TransactionIdentifier,
    criticalExtensions                         CHOICE {
      rrcReconfigurationFailureSidelink-r16
      RRCReconfigurationFailureSidelink-IEs-r16,
        criticalExtensionsFuture               SEQUENCE { }
    }
}
RRCReconfigurationFailureSidelink-IEs-r16 ::=   SEQUENCE {
    lateNonCriticalExtension    OCTET STRING    OPTIONAL,
    nonCriticalExtension        SEQUENCE { }    OPTIONAL,
}
-- TAG-RRCRECONFIGURATIONFAILURESIDELINK-STOP
-- ASN1STOP
```

In the present disclosure, implementations that further enhance the sidelink AS configuration failure event and the signaling design in the PC5 interface are disclosed. In addition, a sidelink AS configuration failure event may also happen when the UE receives the sidelink AS configuration through dedicated control signaling (e.g., an RRC(connection)Reconfiguration message) through the Uu interface. This event may be considered as one sub-case of re-configuration failure in the associated Uu interface (e.g., LTE Uu interface and NR Uu interface). In addition, the UE may be instructed to perform at least one of the following actions when a reconfiguration failure event occurs in the Uu interface:

- continue using the configuration used prior to the reception of the RRCReconfiguration message;
- move to RRC idle state (e.g., if the AS security has not been activated); and
- initiate an RRC re-establishment procedure (e.g., if the AS security has been activated).

Table 4 illustrates example UE behavior upon an RRC reconfiguration failure.

TABLE 4

TS38.331
5.3.5.8     Reconfiguration failure
5.3.5.8.1   Void
5.3.5.8.2   Inability to comply with RRCReconfiguration
The UE shall:
1>  if the UE is in (NG)EN-DC:
    2>  if the UE is unable to comply with (part of) the configuration included in the
        RRCReconfiguration message received over SRB3;
        3>  continue using the configuration used prior to the reception of
            RRCReconfiguration message;
        3>  initiate the SCG failure information procedure as specified in subclause
            5.7.3 to report SCG reconfiguration error, upon which the connection
            reconfiguration procedure ends;
    2>  else, if the UE is unable to comply with (part of) the configuration included in the
        RRCReconfiguration message received over SRB1;
        3>  continue using the configuration used prior to the reception of
            RRCReconfiguration message;
        3>  initiate the connection re-establishment procedure as specified in TS 36.331,
            clause 5.3.7, upon which the connection reconfiguration procedure ends.
1>  else if RRCReconfiguration is received via NR (i.e., NR standalone, NE-DC, or NR-
DC):
    2>  if the UE is unable to comply with (part of) the configuration included in the
        RRCReconfiguration message received over SRB3;
NOTE #0:        This case does not apply in NE-DC.
        3>  continue using the configuration used prior to the reception of the
            RRCReconfiguration message;
        3>  initiate the SCG failure information procedure as specified in subclause
            5.7.3 to report an SCG reconfiguration error, upon which the connection
            reconfiguration procedure ends;
    2>  else if the UE is unable to comply with (part of) the configuration included in the
        RRCReconfiguration message received over the SRB1;
NOTE #0a:       The compliance also covers the SCG configuration carried within octet
strings, e.g., field mrdc-SecondaryCellGroupConfig. The failure behavior defined also
applies in case the UE cannot comply with the embedded SCG configuration or with the
combination of (parts of) the MCG and SCG configurations.
        3>  continue using the configuration used prior to the reception of
            RRCReconfiguration message;
        3>  if AS security has not been activated:
            4>  perform the actions upon going to RRC_IDLE as specified in 5.3.11,
                with release cause 'other'
        3>  else if AS security has been activated but SRB2 and at least one DRB have
            not been setup:

TABLE 4-continued

```
            4>  perform the actions upon going to RRC_DLE as specified in 5.3.11,
                with release cause 'RRC connection failure';
        3>  else:
            4>  initiate the connection re-establishment procedure as specified in 5.3.7,
                upon which the reconfiguration procedure ends;
1>  else if RRCReconfiguration is received via other RAT (Handover to NR failure):
    2>  if the UE is unable to comply with any part of the configuration included in the
        RRCReconfiguration message:
        3>  perform the actions defined for this failure case as defined in the
            specifications applicable for the other RAT.
NOTE #1:        The UE may apply above failure handling also in case the
RRCReconfiguration message causes a protocol error for which the generic error handling
as defined in clause 10 specifies that the UE shall ignore the message.
NOTE #2:        If the UE is unable to comply with part of the configuration, it does not apply
any part of the configuration. In other words, there is no partial success/failure.
```

Observation #3: Different UE behavior may be applied to sidelink AS configuration failure event. The specific UE behavior to be applied may depend on whether the sidelink AS configuration comes from the serving cell (through the Uu interface) or the paired UE (through the PC5 interface via one or more PC5 RRC signalings).

Moreover, since an RRC connected UE (e.g., UE #1 410 in FIG. 4B) may report 'sidelink RRC configuration failure event' (associated with UE #2 420 in FIG. 4B) to the serving cell if the 'failed' sidelink AS configuration problem is generated by the PC5 interface, as illustrated in FIG. 4B, the same sidelink AS configuration failure report may also be applicable when the failed sidelink AS configuration is obtained through the Uu interface.

In some implementations, the noun 'sidelink AS configuration' may be equivalent to 'sidelink RRC configuration' (since the RRC layer manages all the AS layer sidelink configuration) or may be equivalent to 'sidelink radio configurations'. In this condition, both of the 'Sidelink AS Configuration Failure Report' and 'Sidelink RRC Configuration Failure Report' may be the same to the UE and serving RAN for the sidelink unicast/groupcast/broadcast services. However, in some other implementations, the sidelink RRC configuration may be limited by the PC5 RRC connection, which is supported only for the 'sidelink unicast service' in Rel-16 specs. In this condition, the 'PC5 RRC configuration failure report' may be supported only in the sidelink unicast service. In comparison, the UE may transmit a 'Sidelink AS Configuration Failure Report' to the serving cell when the AS configuration failure event occurs to sidelink groupcast/broadcast services.

Observation #4: for a UE, the same Sidelink AS Configuration Failure Report caused by the failed sidelink AS configuration in the PC5 interface may also be applicable when the failed sidelink AS configuration is obtained through the (LTE/NR) Uu interface.

In addition, the conventional Reconfiguration Failure approach in the Uu interface may increase the vulnerability of the RRC connection.

Observation #5: One RRCReconfiguration message may contain sidelink AS configurations for as many as 32 destination IDs. A failed sidelink AS configuration to any of the destination IDs may cause the UE to initiate an RRC re-establishment procedure or to move to RRC idle state. Moreover, the RRC re-establishment procedure or RRC state transitions may also impact the sidelink packet exchange of other destination ID(s), whose associated sidelink AS configuration(s) are not changed/modified in the RRCReconfiguration message.

Therefore, to prevent the (unnecessary) impact from the PC5 interface to the Uu interface and the unnecessary impact to other destination ID(s), implementations are disclosed to enhance the Sidelink AS Configuration Failure Report when only part of the sidelink AS configuration fails at the UE side. Implementations of a partial failure design are disclosed to decrease the impact from the PC5 interface on the Uu interface. Then, management of the sidelink AS configuration may also be simplified.

Observation #6: Partial failure design may be applied to an (Uu) RRC Reconfiguration Failure event when the cause of failure is a sidelink RRC configuration failure event.

In addition, the Sidelink RRC Configuration Failure Report when the sidelink AS configuration is derived through a broadcast control message (e.g., system information) is also in the present disclosure.

Moreover, a full configuration approach similar to the Uu interface may also be implemented on the PC5 RRC connection. In one implementation, the UE handles new NR SL configurations using full configuration operations as in the Uu interface, in case the new configuration for SL cannot be performed by delta configuration (e.g., RRC state transition, change of SIB used for NR/E-UTRA SL and fullconfig present in dedicated signaling).

However, the details of a full configuration on sidelink is still absent. Therefore, how to implement a sidelink full configuration is also in the present disclosure.

Implementation #1: RRCReconfigurationFailureSidelink Signaling Design

Table 5 summarizes implementations of the RRCReconfigurationFailureSidelink message, which is transmitted from the Rx UE to the Tx UE.

TABLE 5

| Information Element | Note |
| --- | --- |
| Cause of Reconfiguration Failure in sidelink | In some implementations, the Rx UE may report the cause value of the RRCReconfigurationFailureSidelink message, such as: |

TABLE 5-continued

| Information Element | Note |
|---|---|
| | 1) Limited Capability. In some implementations, (e.g., the Rx UE moves to Power saving mode, Overheating Report), the UE capability may be limited temporarily.<br>2) In some implementations, the Rx UE may further report the cause of Reconfiguration Failure is from part of the received ReconfigurationSidelink message (such as 'sl-MeasConfig' or 'SL-CSI-RS-Config' or 'slrb-ConfigToAddModList', etc).<br>3) Limited Tx power level. In some implementations, the UE may be limited by its own limitation on transmission power level. So, in this condition, the UE may report 'limited Tx power level' and then report its own capable Tx power level to the Tx UE. |
| UECapabilityInformationSidelink (or UECapacityInformationSidelink) | 1) In some implementations, a Rx UE may report its capability information to the Tx UE (e.g., if the cause of the RRCReconfigurationFailureSidelink is due to the Rx UE's limited capability (or capacity), such as the Rx UE is moving to power saving mode or an overheating condition happens to the Rx UE. So, the Rx UE may send the UECapabilityInformationSidelink to the Tx UE.)<br>2) The UECapabilityInformationSidelink information element may be included in the RRCReconfigurationFailureSidelink message.<br>3) The content of the UECapabilityInformationSidelink could be according to 3GPP TS 36.331 V16.0.0 (by referring to the SL-Parameters transmitted by the UE to a serving eNB for LTE V2X service implementation).<br>4) In some additional implementations, the Tx UE may already have stored the UECapabilityInformationSidelink of the Rx UE. However, the Rx UE may need to update the UECapabilityInformationSidelink stored in the Tx UE side (e.g., the sidelink reconfiguration failure event happens due to a Rx UE capability limitation). So, delta signaling approach may be implemented while the Rx UE wants to update the UECapabilityInformationSidelink stored in the Tx UE side. Through the delta signaling approach, the Rx UE may just report part of the UECapabilityInformationSidelink which the Tx UE needs to modify. So, to the Tx UE side, the Tx UE would update the stored UECapabilityInformationSidelink by referring to the UECapabilityInformationSidelink received through the RRCReconfigurationFailureSidelink received from the Rx UE.<br>5) In some implementations, the Rx UE may transmit multiple (two or more than two) sets of UECapabilityInformationSidelink candidates, where each set of the UECapabilityInformationSidelink candidate may be further associated with one sl-CapCandidate_Index, to the Tx UE. In addition, the Rx UE may only implement the PC5 RRC connection (associated with the Tx UE) based on one of the transmitted UECapabilityInformationSidelink candidates. In this condition, the Tx UE may choose one UECapabilityInformationSidelink set among all the candidates that the Tx UE receives from the Rx UE. Then, the Tx UE may reply with the sl-CapCandidate_Index associated with the chosen UECapabilityInformationSidelink to the Rx UE. Then, the Rx UE may implement the PC5 RRC connection with the Tx UE based on the UECapabilityInformationSidelink indicated by the Tx UE. This implementation may be bi-directional between the Tx/Rx UE. |

TABLE 5-continued

| Information Element | Note |
|---|---|
| | 6) In some implementations, the Rx UE may transmit multiple (two or more than two) sets of RRCReconfigurationFailureSidelink candidates, where each set of RRCReconfigurationFailureSidelink candidate may be further associated with one sl-RRC_Candidate_Index, to the Tx UE. In addition, the Rx UE may only implement the PC5 RRC connection (associated with the Tx UE) based on one of the transmitted RRCReconfigurationFailureSidelink candidates. In this condition, the Tx UE may choose one RRCReconfigurationFailureSidelink set among all the candidates that the Tx UE receives from the Rx UE. Then, the Tx UE may reply with the sl-RRC_Candidate_Index associated with the chosen RRCReconfigurationFailureSidelink to the Rx UE. Then, the Rx UE may implement the PC5 RRC connection with the Tx UE based on the RRCReconfigurationFailureSidelink indicated by the Tx UE. This implementation may be bi-directional between the Tx/Rx UE.<br>7) In some implementations, the Rx UE may also send a sidelink UE capability Enquiry message to the Tx UE for the sidelink UE capability request. |
| Sidelink (Layer-2) Destination Identifier | 1) In some implementations, the sidelink configurations may involve the configurations for more than one target (Layer-2) Destination Identifier.<br>2) In addition, within all the (Layer-2) Destination Identifiers indicated in the RRCReconfigurationSidelink message, it is possible that only a subset of the sidelink configurations (associated with a subset of indicated (Layer-2) Destination Identifiers) fails.<br>3) Then, in this condition, the Rx UE may only report the sidelink (Layer-2) Destination Identifiers for which the associated sidelink configuration fails. In some other conditions (e.g., while multiple candidates of RRCReconfigurationFailureSidelink is received from the Tx UE), the Rx UE may report the failed RRC_Candidate_Index to the Tx UE.<br>4) In other words, the sidelink configurations associated with other (Layer-2) Destination Identifiers may be applicable to the Rx UE if the Rx UE does not report the associated sidelink (Layer-2) Destination Identifier(s) in the RRCReconfigurationFailureSidelink message. |
| SL-RB index associated with the failed sidelink radio bearer configuration | 1) In some implementations, only part of the received RRCReconfigurationSidelink fails. For example, the Tx UE adds three sidelink radio bearers (SL-RBs) and the corresponding Layer-2 configuration to all the added SL-RBs. In addition, each sidelink radio bearer configuration would be associated with one index (e.g., slrb-PC5-ConfigIndex)). Then, the reconfiguration failure event may happen to only a subset of the added sidelink radio bearers. In this condition, the UE may report the slrb-PC5-ConfigIndex(-ies) which fails during the RRC reconfiguration phase.<br>2) In some implementations, the UE may not report the SL-RB index(-ies) associated with the SL-RB configuration(s) which may be applicable in the Rx UE side. |
| Indication of failed SDAP Configuration | 1) In some implementations, the Rx UE may further reply with 'SDAP configuration failure' (may be with one associated failed SL-RB index) to the Tx UE.<br>2) For example, the reconfiguration failure event may happen when the Rx UE could not apply |

TABLE 5-continued

| Information Element | Note |
|---|---|
| | an applicable SL-QoS-Profile based on the received sl-Range. (in some implementations, a sub-clause: 'sl-Range mapping error' may be further indicated by the Rx UE in the ReconfigurationFailureSidelink message). Note: the parameter sl-range indicates the range parameter of the QoS flow. So, to the pair of Tx/Rx UE, it is possible that the Rx UE could not find appropriate QoS flow mapping and the reconfiguration failure event happens. |
| Indication of failed PDCP Configuration | 1) In some implementations, the Rx UE may reply with 'PDCP configuration failure' (may be with one associated failed SL-RB index) to the Tx UE. |
| Indication of failed RLC Configuration | 1) In some implementations, the Rx UE may reply with 'RLC configuration failure' (may be with one associated failed SL-RB index) to the Tx UE.<br>2) For example, in the Rx UE side, the reconfiguration failure event may happen while the ARQ mode (e.g., Un-Acknowledgement mode/Acknowledgement mode) of one existing RLC entity is modified by the ReconfigurationSidelink message (which may cause the reconfiguration failure event). |
| Sidelink Logical Channel identity associated with the failed sidelink logical channel. | 1) In some implementations, the Rx UE may reply with 'sidelink logical channel configuration failure' (may be with one associated failed SL-RB index) to the Tx UE.<br>2) In addition, in some implementations, there may be only a subset of logical channel configurations that fail (and each logical channel configuration may be further associated with one sidelink logical channel identity. E.g., sl-LogicalChannelIdentity).<br>3) So, the Rx UE may report the sl-LogicalChannelIdentity for which the reconfiguration failure event happens.<br>4) In other words, other sidelink logical channel configurations (for which the associated sl-LogicalChannelIdentity(-ies) are not reported by the Rx UE) are applicable to the UE.<br>5) In some implementations, the logical channel identifier provided in this RRCReconfigurationSidelink message may collide with an existing LCID stored prior to the reception of the RRCReconfigurationSidelink message. In this condition, the UE may also report the corresponding LCID in the RRCReconfigurationFailureSidelink message. |
| Suggested SL-RB configuration (e.g., to the failed SL-RB configuration) | 1) In some implementations, the Rx UE may provide its own suggested SL-RB configuration to the UE in the RRCReconfigurationFailureSidelink message.<br>2) In some implementations, the delta signaling approach may be applied while the Rx UE transmits the suggested SL-RB configuration. For example, only a subset of the SL-RB configuration fails in the Rx UE side. Then, the Rx UE may report the failed SL-RB index with the associated suggested SL-RB configuration.<br>3) In addition, the delta signaling approach SL-RB configuration may be implemented by the subset of the following configurations:<br>sl-SDAP-ConfigPC5-r16        SL-SDAP-ConfigPC5-r16 OPTIONAL, -- Need N<br>    sl-PDCP-ConfigPC5-r16    SL-PDCP-ConfigPC5-r16 OPTIONAL, -- Need N<br>    sl-RLC-ConfigPC5-r16        SL-RLC-ConfigPC5-r16 OPTIONAL, -- Need N<br>    sl-MAC-LogicalChannelConfigPCS-r16    SL-LogicalChannelConfigPCS-r16 OPTIONAL, -- Need N |

TABLE 5-continued

| Information Element | Note |
|---|---|
| | So, if the Tx UE delivers all the configurations above (SDAP/DPCP/RLC/MAC layer configurations to the SL-RB) to the Rx UE, the Rx UE may only report the suggested PDCP configuration (which means reconfiguration failure happens to the PDCP configuration). In other words, the other Layer-2 configuration (e.g., SDAP/RLC/MAC configuration) associated with the same SL-RB is applicable to the Rx UE. |
| Measurement configuration Failure | 1) In some implementations, the Rx UE may report a 'sidelink measurement configuration failure' in the reply.<br>2) For example, the sidelink measurement configuration may be associated with a:<br>   a. Target (Layer-2) Destination index/(Layer-2) Destination identifier (so, sidelink measurement configuration failure may happen if the Rx UE already releases the PC5 RRC (or upper layer, e.g., PC5-S protocols) with this target Destination index or the (Layer-2) Destination index becomes invalid).<br>   b. Target sidelink component carrier (so, sidelink measurement configuration failure may happen if the Rx UE does not support this target sidelink component carrier).<br>   c. Target objective, such as SL-RSRP (sidelink Reference Signal Received Power) or CBR (Channel Busy Ratio). (so, sidelink measurement configuration failure may happen if the UE fails to support the target objective).<br>3) In some implementations, only a subset of the sidelink measurement configuration fails. For example, each measurement configuration may be associated with one measurement object identity. In this condition, the Rx UE may only report the identities associated with these problematic sidelink measurement configurations.<br>4) In other words, other sidelink measurement configurations (of which the associated measurement object ID(s) are not reported by the Rx UE) are applicable to the UE. |
| Sidelink reference signal configuration failure | 1) In some implementations, the Rx UE may report a 'sidelink reference signaling configuration' failure.<br>2) In some implementations, a Sidelink Channel State Information Reference Signal (SL CSI-RS) configuration may be delivered to the Rx UE for the Rx UE to transmit (or receive) an SL CSI-RS based on the received configuration (So, sidelink reference configuration failure may happen if the UE fails to support transmit/receive the target CSI-RS based on the received sidelink reference signal configuration). |
| Additional Note: | |
| 1) | In some implementations of PC5 RRC Reconfiguration, the 'partial reconfiguration' may be realized. For example, if a subset of the received sidelink radio bearer configurations fails, the UE may release the failed configuration (and then the UE may implement the received sidelink radio bearer configurations which are applicable). The same design may also be applicable to the sidelink measurement configuration or other parts in the received RRCReconfigurationSidelink message. |
| 2) | In some implementations, the Tx UE may forward the (any combination of the) received information elements (which are received from the Rx UE) to the serving cell (with the associated (Layer-2) destination ID of the corresponding Rx UE). |

Implementation #1-1

Figure 5A:
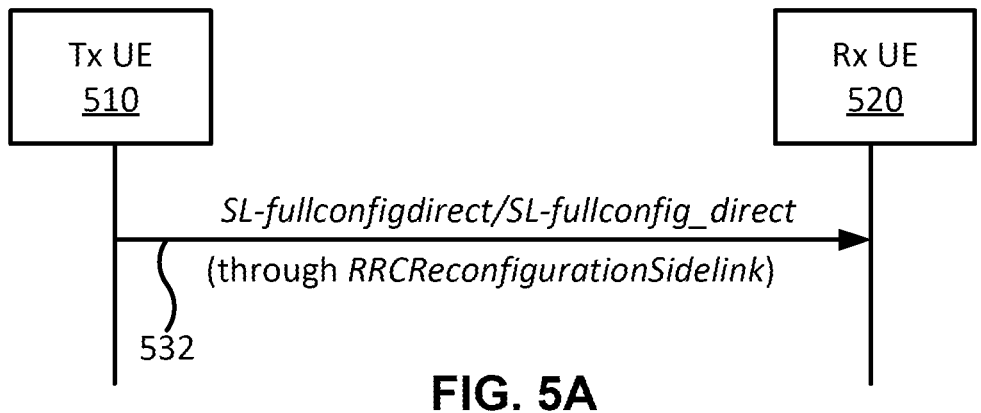
FIG. 5A illustrates signal flow of sidelink full reconfiguration according to an implementation of the present disclosure.

FIG. 5A illustrates signal flow 500A of sidelink full reconfiguration according to an implementation of the present disclosure. In some implementations, the Tx UE 510 may further indicate whether 'sidelink full configuration for the corresponding sidelink RRC Reconfiguration' is configured or not (e.g., one specific information element 'SL-fullconfig=true' is provided to the Rx UE 520 in the RRCReconfigurationSidelink message.) If the sidelink reconfiguration failure event occurs, the Rx UE 520 may perform the sidelink full configuration procedure accordingly (while SL-fullconfig=true). The Tx UE 510 may also implement sidelink full configuration after receiving the RRCReconfigurationFailureSidelink message from the Rx UE 520. Table 6 illustrates an example of UE behavior upon a sidelink RRC reconfiguration failure event.

TABLE 6

Figure 5B:
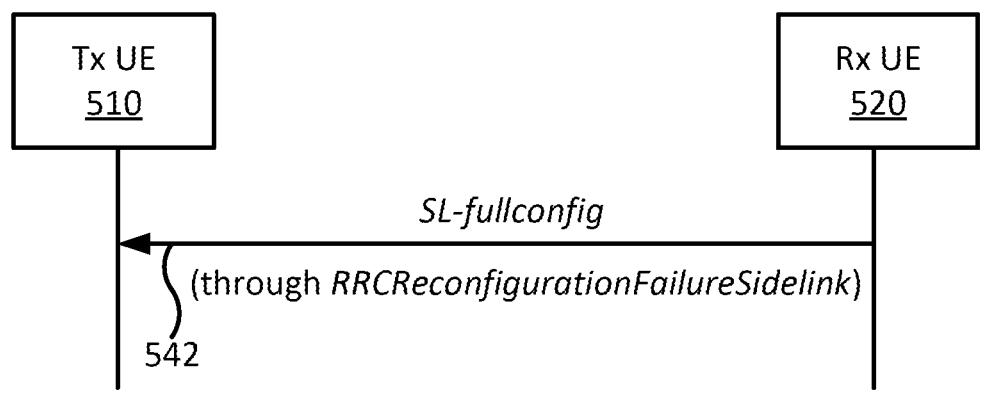
FIG. 5B illustrates signal flow of sidelink full reconfiguration according to another implementation of the present disclosure.

Sidelink RRC reconfiguration failure
The (Tx) UE shall perform the following actions upon reception of the RRCReconfigurationFailureSidelink message:
1> stop timer T400, if running;
1> if the RRCReconfigurationSidelink message transmitted prior to the reception of the RRCReconfigurationFailureSidelink message includes the SL-fullconfig.
    2> Perform the sidelink full configuration to the PC5 RRC Connection associated with the corresponding Destination Identity (or the corresponding Rx UE).
1> if UE is in RRC_CONNECTED state
    2> perform the sidelink UE information for NR sidelink communication procedure, as specified in 5.X.3.3 or sub-clause 5.10.X in TS 36.331;

FIG. 5B illustrates signal flow 500B of sidelink full reconfiguration according to another implementation of the present disclosure. In some implementations, when the sidelink reconfiguration failure event occurs, the Rx UE 520 may start the sidelink full configuration procedure by itself (the Tx UE 510 may not deliver the SL-fullconfig IE in the RRCReconfigurationSidelink message to the Rx UE 520). In action 542, the Rx UE 520 may provide the information element 'SL-fullconfig=true' in the RRCReconfiguration-FailureSidelink message to the Tx UE 510. After receiving the RRCReconfigurationFailureSidelink message, the Tx UE 510 may also implement the sidelink full configuration to the corresponding PC5 RRC connection. Table 7 illustrates an example UE behavior upon a sidelink RRC reconfiguration failure event.

TABLE 7

Sidelink RRC reconfiguration failure
The (Tx) UE shall perform the following actions upon reception of the RRCReconfigurationFailureSidelink message:

TABLE 7-continued

1> stop timer T400, if running;
1> if the RRCReconfigurationFailureSidelink message includes the SL-fullconfig.
    2> Perform the sidelink full configuration to the PC5 RRC Connection associated with the corresponding Destination Identity (of corresponding Rx UE).
1> if UE is in RRC_CONNECTED:
    2> perform the sidelink UE information for NR sidelink communication procedure.

In some implementations, the Rx UE 520 may implement sidelink full configuration implicitly if reconfiguration failure happens to the Rx UE 520 after receiving the RRCReconfigurationSidelink message. Then, after implementing sidelink full configuration, the Rx UE 520 may also reply with the RRCReconfigurationFailureSidelink message to the Tx UE 510.

In some implementations, the Tx UE 510 may initiate sidelink full configuration implicitly after receiving the RRCReconfigurationFailureSidelink message (e.g., without further information about the failed sidelink configuration information or SL-fullconfig=true) from the Rx UE 520.

In some implementations, one UE (e.g., the Rx UE 520) may obtain the SL-fullconfig information element from one cell in an RAN through the relaying of another UE (e.g., the Tx UE 510). So, the Tx UE 510 may receive the SL-fullconfig (e.g., associated with one or more than one (Layer-2) Destination ID which has PC5 RRC connection with the Tx UE 510) from its serving cell through dedicated control signaling or broadcast system information.

The sidelink full configuration may include all or part of the following proposed UE implementations.

Sidelink Full Configuration for Sidelink RRC Connection

Table 8 illustrates an example method for sidelink full configuration.

TABLE 8

The UE shall implement (part of) the implementations to the PC5 RRC Connection with (at least) one corresponding (Layer-2) Destination Identity:
1> release/ clear all current dedicated radio configurations (associated with the corresponding Destination Identity) except for the following:
- the sl-RNTI (and the sl-CS-RNTI);
- the AS security configurations associated with the PC5 RRC Connection;
- (and/or sl-MeasConfig);
- (and/or sl-CSI-RS-Config);
NOTE 1: (in some implementations) Radio configuration is not just the resource configuration but includes other configurations like sidelink measurement configuration (e.g., sl-MeasConfig) and sidelink CSI-RS configuration (e.g., sl-CSI-RS-Config).
    1> if the sidelink full configuration in the masterCellGroup includes the reconfigurationWithSync (i.e., SpCell change, such as (inter-RAT/intra-RAT) handover procedure) or
    1> the sidelink full configuration is initiated due to cell (re)selection procedure if the UE is in RRC inactive/idle state or
    1> the sidelink full configuration is initiated by the UE due to (LTE/NR) RRC state changes:
        2> release/clear all current common radio configurations associated with the corresponding Destination Identity;
    1> apply the default L1 parameter values as specified in corresponding physical layer specifications except for the following:
- parameters for which values are provided in the sidelink SRB;
    1> apply the default MAC configuration for the MAC entity (or MAC procedures) of the corresponding PC5 RRC connection associated with the corresponding Destination Identity (the default MAC configuration may be pre-defined for the PC5 RRC Connection in the 3GPP specification or pre-installed in the sidelink pre-configuration);

TABLE 8-continued

1>    apply the default sidelink SRB configuration for the sidelink SRB of the corresponding PC5 RRC connection associated with the corresponding Destination Identity (the default sidelink SRB configuration may be pre-defined for the PC5 RRC Connection in the 3GPP specification or pre-installed in the sidelink pre-configuration);
  1>        for each PC5 RRC Connection that is part of the current UE configuration:
      2>    release the SDAP entity of the PC5 RRC Connection associated with the corresponding Destination Identity;
      2>    release each sidelink DRB corresponding to the PC5 RRC Connection associated with the corresponding Destination Identity (or apply the default sidelink DRB configuration for the sidelink DRB of the corresponding PC5 RRC connection (the default sidelink DRB configuration may be pre-defined for the PC5 RRC Connection in the 3 GPP specification or pre-installed in the sidelink pre-configuration));

In some implementations, the Tx UE 510 may also instruct the Rx UE 520 to implement the sidelink full configuration procedure directly (e.g., the RRCReconfigurationSidelink message contains another IE 'SL-fullconfig_direct=true' to trigger the Rx UE to implement the sidelink full configuration procedure directly, as illustrated in the FIG. 5A. In action 532, the Tx UE 510 may transmit SL-fullconfigdirect or SL-fullconfig_direct via the RRCReconfigurationSidelink message. In some implementations, it is possible that no other sidelink RRC reconfiguration IE (which conveys sidelink (radio) configurations for the Rx UE 520) is provided in the same signaling (e.g., the RRCReconfigurationSidelink message) to the Rx UE 520. So, the Rx UE 520 may initiate the sidelink full configuration procedure directly after receiving the RRCReconfigurationSidelink message. Then, after the sidelink full configuration message procedure is finished successfully at the Rx UE 520, the Rx UE 520 may also reply with the RRCReconfigurationCompleteSidelink message to the Tx UE 510. In some other implementations, other sidelink RRC reconfiguration IE (which conveys sidelink RRC configurations for the Rx UE 520) may be provided in the same signaling by the Tx UE 510 (e.g., RRCReconfigurationSidelink message in action 532) to the Rx UE 520. So, the Rx UE 520 may initiate the sidelink full configuration procedure directly after receiving the RRCReconfigurationSidelink message with 'SL-fullconfig_direct=true'. Then, after the sidelink full configuration message procedure is finished successfully at the Rx UE 520, the Rx UE 520 may re-configure the sidelink AS layer configuration associated with the Tx UE 510 based on the sidleink radio configurations received in the same RRCReconfigurationSidelink message in action 532. After re-configuring the sidelink radio configuration with Tx UE 510, the Rx UE 520 may also reply the RRCReconfigurationCompleteSidelink message to the Tx UE 510. Please note: during the sidelink full configuration, the Rx UE 520 may release or clear all current sidelink radio configurations associated with the Tx UE 510. In some implementations, the Rx UE 520 may also release the sidelink radio bearers (SL-DRBs) associated with the Tx UE 510. In some additional implementations, the UE may also apply the default MAC configuration for the sidelink specific MAC functions (or MAC entity) associated with the Tx UE 510. For the sidelink specific MAC associated with the Tx UE 510, in some implementations, the original sidelink specific MAC associated with the Tx UE 510 (before the Rx UE 520 receives the RRCReconfigurationSidelink message in action 532 from the Tx UE 510) may be configured as part of one MAC entity, which may be shared with the sidelink specific MAC (functions) associated with other Layer-2 destination IDs in (LTE/NR) PC5 interface and/or the (non-sidelink specific) MAC (functions) associated with the serving RAN in the (LTE/NR) Uu interface. However, in some other implementations, the sidelink specific MAC (functions) associated with the Tx UE 510 may be configured as one independent MAC entity at the Rx UE 520 side. In addition, for default MAC application, the original sidelink specific MAC associated with the Tx UE 510 may be reset firstly when the Rx UE 520 is implementing sidelink full configuration (based on the instruction from the Tx UE 510). Please also note, the sidelink radio configuration may not be limited to the sidelink radio resource configuration (e.g., sidelink Tx/Rx resource pool configuration or exceptional resource pool configuration) but may also include other configurations about the (LTE/NR) PC5 interface, such as sidelink measurement configuration and/or sidelink CSI-RS configuration.

Figure 5C:
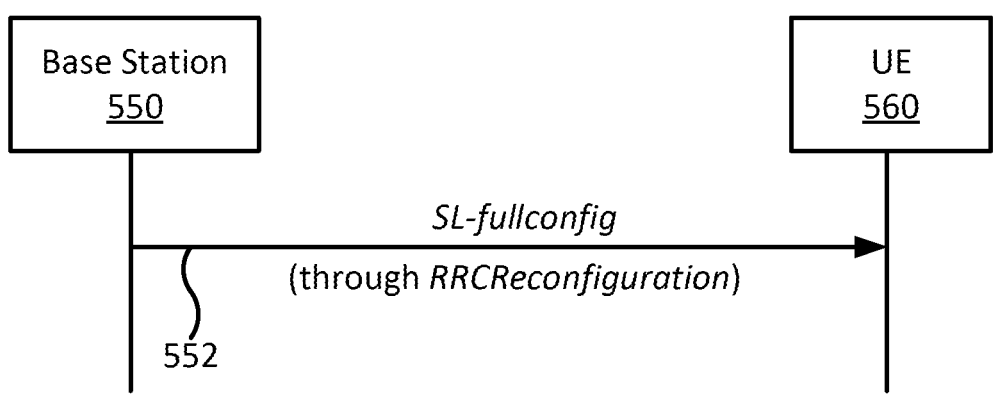
FIG. 5C illustrates signal flow of sidelink full reconfiguration according to still another implementation of the present disclosure.

FIG. 5C illustrates signal flow 500C of sidelink full reconfiguration according to still another implementation of the present disclosure. In some implementations, the base station 550 (e.g., the E-UTRA eNB or NR gNB) may configure the UE 560 (which has a PC5 RRC connection(s) with one or more than one Rx UE(s)) to implement the sidelink full configuration procedure (e.g., by configuring SL-fullconfig=true). In some implementations, SL-fullconfig=true may be associated with all the (active) PC5 RRC connections of the corresponding UE 560 (so, the UE 560 may apply sidelink full configurations to all the associated Rx UEs). In some other implementations, SL-fullconfig=true may be associated with a subset of the (active) PC5 RRC connections. For example, the (Layer-2) Destination IDs of some Rx UEs may be configured by the base station along with the 'SL-fullconfig=true' IE in the RRCReconfiguration message. After receiving the RRCReconfiguration message, the UE 560 may implement the sidelink full configuration to the PC5 RRC connections associated with those indicated (Layer-2) Destination IDs. In contrast, the PC5 RRC Connections of other UEs (whose (Layer-2) Destinations IDs are not indicated in the RRCReconfiguration message) may not be impacted by the 'SL-fullconfig=true' IE. In some implementations, the SL-fullconfig IE may apply to all the destinations associated with the (Rx) UE, which may also include destinations associated with sidelink unicast/group-cast/broadcast services.

As illustrated in FIG. 5C, in some implementations, the subset of (active) PC5 RRC connections associated with the SL-fullconfig=true may already be signaled by the serving base station 550 via (at least) one previous RRCReconfiguration message(s) before the action 552 (e.g., the base station 550 has configured the sidelink radio configurations associated with the subset of (active) PC5 RRC connections in the (at least one) previous RRCReconfiguration message(s) before the action 552). Then, in action 552, the base station 550 may configure 'SL-fullconfig=true' in the RRCReconfiguration message directly without re-indicating the (Layer-2) Destination (UE) IDs of the subset of (active) PC5 RRC connections in the RRCReconfiguration message. After receiving 'SL-fullconfig=true' in action 552, the UE 560 may implement sidelink full configuration for the subset (active) PC5 RRC connections associated with these (Layer-2) Destination (UE) IDs if the sidelink RRC configuration associated with the (Layer-2) Destination (UE) ID is configured by the serving base station 550 via the (at least one) previous RRCReconfiguration message(s). In contrast, after action 552, the UE 560 may not implement sidelink full configuration for the (active) PC5 RRC connection associated with one (Layer-2) Destination ID if the sidelink RRC configuration associated with the same (Layer-2) Destination ID is not configured by the base station 550 via the (at least one) previous RRCReconfiguration message(s).

In some implementations, there may not be a SL-fullconfig IE in the RRCReconfiguration message. Instead, there may be a fullconfig IE configured in the control signaling dedicated to NR sidelink operation (e.g., in the sl-ConfigDedicatedNR message) such that the UE knows that the sidelink full configuration is to be initiated rather than the conventional full configuration procedure in the Uu interface.

In some implementations, the original fullconfig IE, which is originally defined the full configuration of the RRC connection in the Uu interface (such that the fullconfig IE is configured out of the sl-ConfigDedicatedNR IE), may be configured to have the functionalities of SL-fullconfig in the present disclosure. The UE may initiate the sidelink full configuration procedures on one (or more than one) active PC5 RRC connections and the active RRC connection (in the Uu interface) if fullconfig is configured to the UE via the RRCReconfiguration message.

The disclosed RRC signaling (and the disclosed information elements) may not be limited to the NR RRC signaling protocols (they may be realized in the LTE RRC protocols to implement sidelink full configuration on the LTE/NR PC5 interface).

In one implementation, the UE may also initiate the sidelink full configuration if the UE is re-configuring its own sidelink AS configuration based on the received sidelink configuration, which is received from the serving cell (e.g., through dedicated control signaling or broadcast system information, which may or may not be through the system information on-demand procedure). The serving cell may or may not deliver the SL-fullconfig to the in-coverage UEs through dedicated control signaling (e.g., RRC signaling) or system information (e.g., the system information specified for NR sidelink or V2X services).

All or part of the information elements in the present disclosure related to the Uu interface may be delivered through RRC signaling, such as an RRC Setup message, an RRC Reconfiguration message, an RRC Release message with/without a suspend configuration, an RRCReconfiguration message with a reconfigurationwithsync IE (e.g., for inter-RAT/intra-RAT handover procedure or special cell change) or an RRCReconfiguration message without a reconfigurationwithsync IE, or an RRC Resume message. In the uplink direction, (part of) the disclosed implementations may be transmitted through an RRC establishment request message, an RRC Re-establishment message, or an RRC Resume Request message. In addition, the disclosed implementations may not be limited to NR sidelink protocols. For example, the disclosed implementations may also be applicable to LTE (ProSe) sidelink operation or LTE V2X sidelink communication services.

Implementation #2

Table 9 lists implementations of UE behaviors upon reconfiguration failure events. In Table 9, the UE may initiate the conventional (RRC) Reconfiguration Failure event if the failed RRC configurations are provided for the (LTE/NR) Uu interface (e.g., case #1/#2 in Table 9).

TABLE 9

| Reconfiguration Failure Event (to connected UE) | | | |
|---|---|---|---|
| Case | Reconfiguration Failure (Uu) | Sidelink AS Reconfiguration Failure | UE Behavior |
| #1 | Yes | Yes | (as usual) UE may initiate a Reconfiguration Failure event |
| #2 | Yes | No | (as usual) UE may initiate a Reconfiguration Failure event |
| #3 | No | Yes | (1) In some implementations, UE may initiate just sidelink radio link failure to the corresponding Layer 2 Destination ID(s) (e.g., UE may release the failed sidelink radio bearers) or release the PC5 RRC connection with one (or a subset of) Destination IDs.<br>(2) In some implementations, UE may not initiate a Reconfiguration Failure event (or part of the UE implementations in the Reconfiguration failure event).<br>(3) In some implementations, the UE may still initiate a Reconfiguration failure event.<br>(4) In some implementations, UE may report a sidelink RRC configuration failure event to the serving cell. Please also note, the UE may implement any combinations of actions (1)~(4) above. |

TABLE 9-continued

Reconfiguration Failure Event (to connected UE)

| Case | Reconfiguration Failure (Uu) | Sidelink AS Reconfiguration Failure | UE Behavior |
|---|---|---|---|
| #4 | No | No | UE may reply with an RRC(connection)ReconfigurationComplete message to the serving RAN |

In comparison, the UE may not initiate the conventional (RRC) Reconfiguration Failure event if the failed configurations are provided for the (LTE/NR) PC5 interface of one or more than one Destination IDs (e.g., case #3). Instead, the UE may just implement 'partial failure design'. For example, only sidelink radio link failure may be implemented or only 'failed' sidelink radio bearers (of those corresponding Destination IDs) may be released/cleared. In addition, the UE may also report a 'sidelink RRC configuration failure' event to the serving cell. Moreover, in some implementations, the UE may not initiate a Reconfiguration Failure event (or part of the UE implementations in the Reconfiguration Failure event). In other words, the RRC connection in the Uu interface may not be impacted or the impact on the RRC connection may be limited. Details of the implementations in Table 9 are disclosed in Implementation #2-1.

Implementation #2-2 addresses the case in which the failure event indication of the sidelink AS configuration is obtained through broadcast system information.

Implementation #2-1 Sidelink RRC Configuration Failure Event Caused by Dedicated Control Signaling from the Serving Cell Implementation #2-1 addresses the sidelink RRC configuration failure when the UE receives the sidelink RRC configuration through dedicated control signaling (e.g., RRC signaling) in the Uu interface. Table 10 lists detailed implementations of Implementation #2-1, which may correspond to Case #3 in Table 9.

TABLE 10

Implementation#2-1 (Case#3 in Table 9)

(1) Sidelink RRC configuration failure (with one or more than oneassociated Destination ID(s)) while the UE receives the sidelink RRC configuration from the serving cell through dedicated control signaling.
(2) The dedicated control signaling may cover (but not limited to) RRCmessage(s). For example, an RRC (Connection) Setup message, RRC (Connection) Reconfiguration message (with or without mobilitycontrolinformation based on LTE RRC protocol), RRC (Connection) Reconfiguration message (with or without reconfigurationwithsync based on NR RRC protocol), RRC(Connection)Resume message, RRC(Connection) Reestablishment message, RRC(Connection)Reject message, RRC(Connection)Release message, UE Capability Enquiry message.
(3) By considering the target sidelink frequency component carrier, the implementation further includes the following cases:
Case#a: The UE may obtain the sidelink RRC configuration by reading the dedicated control signaling from the serving cell (e.g., the Primary cell), where the sidelink RRC configuration may includethe serving frequency carrier (i.e., the same frequency carrier with the serving cell or the frequency carrier of other serving cell(s), which may be a secondary cell(s) or special cell(s)).
Case#b: The UE may obtain the sidelink RRC configuration by reading thededicated control signaling from the serving cell (e.g., the Primary cell), where the sidelink RRC configuration may include a non-serving frequency carrier (i.e., a frequency carrier different from the serving cell).
(4) (Cross-RAT scenario) By considering the radio access technologies in Uu/PC5 interface:
a. One NR UE (e.g., a UE whose RRC entity is under either NR RRC connected state/NR RRC inactive state or NR RRC idle state) may receive an LTE (and/or) NR sidelink RRC configuration from a serving NR cell (e.g., through NR RRC signaling).
b. One LTE UE (e.g., a UE whose RRC entity is under either LTE RRC connected state/LTE RRC inactive state or LTE RRC idle state) may receive an LTE (and/or) NR sidelink RRC configuration from a serving LTE cell (e.g., through LTE RRC signaling).
Then, the UE may configure the (LTE/NR) PC5 interface based on th ereceived (LTE/NR) sidelink RRC configuration. The implementation#2-1 is related to (LTE/NR) RRC Connected UEs. However, the implementation may not be limited by the (LTE/NR) RRC state of the UE (e.g., (LTE/NR) RRC inactive state/(LTE/NR) RRC idle state).
(5) One UE may be associated with one or more than one Layer-2 Destination (UE) ID(s). Then, through one (or more than one) dedicated control signaling, the UE may receive one or more than one sidelink RRC configurations and each sidelink RRC configuration may be indicated for application to one or all or a subset of the associated Destination ID(s).

TABLE 10-continued

Figure 6:
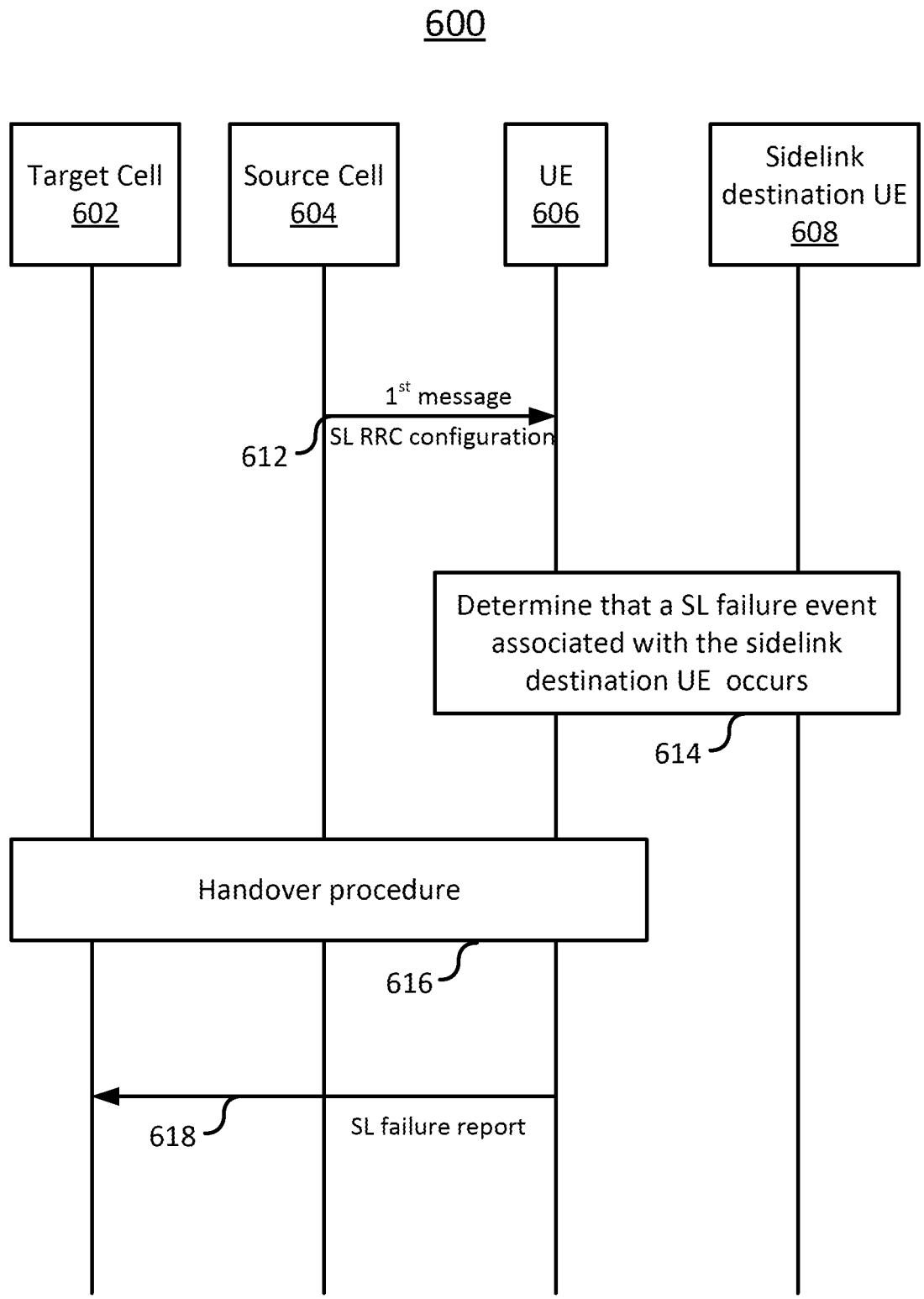
FIG. 6 illustrates a process for handling a sidelink failure event according to an implementation of the present disclosure.

| Implementation#2-1 (Case#3 in Table 9) | |
|---|---|
| Uu interface | UE behavior:<br>(1) the UE may report the 'sidelink RRC configuration failure' or 'sidelink radio link failure' to the serving RAN.<br>    a. One 'Sidelink RRC Configuration Failure' may be configured in the Information Element as follows: "UEAssistanceInformation" or "UEAssistanceInformationNR" "UEAssistanceInformationEUTRA" or 'SidelinkUEInformation' (e.g., SidelinkUEInformationNR' or SidelinkUEInformationEUTRA) in the uplink control signaling, but not limited to.<br>    b. The 'Sidelink RRC Configuration Failure' IE may be associated with one or more than one Layer-2 Destination (UE) ID(s) with which the UE has sidelink data exchange in the (LTE/NR) PC5 interface. So in some implementations, the UE may report the Layer-2 Destination UE ID of a specific UE at which sidelink RRC configuration failure event occurs or sidelink radio link failure event occurs, to the serving cell.<br>    c. In some implementations, one configured IE 'sidelink RRC Configuration Failure' may contain one or more than one bit and each bit may be associated with one corresponding Destination ID. (For example, the UE may also report the sidelink Destination List to the serving cell. So, corresponding to the sequence of the sidelink Destination List, one 'sidelink RRC Configuration Failure bitmap' may be for the UE to report that sidelink RRC configuration failure events happen to a set of sidelink Destination IDs).<br>    d. To each sidelink RRC Configuration Failure bit, the UE may set the Sidelink RRC Configuration Failure = 1 to indicate the sidelink RRC configuration failure event happens to one (or more than one) associated Destination ID. In some implementations, the 'sidelink RRC configuration Failure' may be a Boolean function (Sidelink RRC Configuration Failure = true) to indicate the sidelink RRC configuration failure event to one (or more than one) associated Destination ID(s).<br>    e. In some implementations, the UE may report the Sidelink RRC Configuration Failure Report to the serving cell through an RRC(Connection)ReconfigurationComplete message. (e.g., during handover or other mobility events, as shown in FIG. 6). In FIG. 6, the UE 606 may receive the sidelink RRC configuration from one cell (e.g., the source cell 604 in a handover procedure) and then the UE 606 may transmit a sidelink RRC configuration failure report to another cell (e.g., the target cell 602 in the handover procedure). The source cell 604 and the target cell 602 may be located in a coverage area of the same base station/gNB (e.g., intra-gNB handover procedure) or different base stations (e.g., inter-gNB handover procedure). In some other implementations, the UE may report RRC(Connection)ReconfigurationComplete message to the target cell 602 during the handover procedure in action 616. Then, the UE may transmit the SL failure report to the target cell 602 in action 618 (e.g., via the transmission of UEAssistanceInformationNR in one UL UE-specific RRC signaling).<br>    In some other implementations, the UE may also transmit the 'sidelink RRC configuration Failure Report' event through other uplink RRC signaling (e.g., an RRC Resume Complete message or RRC Setup Complete message).<br>(2) UE may not implement (part of) the conventional Reconfiguration Failure implementations, such as:<br>a. the UE may not move to an (NR/LTE) RRC idle state.<br>b. the UE may not initiate an RRC re-establishment procedure with the serving cell. |
| PC5 interface | (1) The UE may not continue using the sidelink radio configuration used prior to the reception of the RRCReconfiguration message. Instead, the UE may implement partial failure implementations in the sidelink RRC configuration based on the following approaches:<br>    a. Release the PC5 RRC connection of impacted Destination(s)<br>        To the associated Destination ID(s) for which sidelink RRC configuration failure happens, the UE may not continue using the configuration used prior to the reception of the RRCReconfiguration message. Instead the UE may release, to a unicast service with the impacted Destination IDs, the |

TABLE 10-continued

Implementation#2-1 (Case#3 in Table 9)

PC5 RRC connections which include the impacted sidelink
          Destination(s).
     b.  Release the impacted sidelink radio bearer of impacted
         Destination(s)
        I  In some implementations, for one associated Destination
          ID, it is also possible that only a subset of the sidelink radio
          bearers are impacted by the sidelink RRC configuration
          failure event. For example, the UE may have existing
          sidelink radio bearers (SLRB#1~5) with one associated
          Destination ID and the SLRB#3 and SLRB#5 are impacted
          by the sidelink RRC configuration failure event. Then, the
          UE may only release the SLRB#3, and SLRB#5 with the
          associated Destination ID. In other words, the existing
          SLRB#1/2/4 are still kept and the PC5 RRC connection
          may still be kept based on the existing SLRB#1/2/4.
     c.  Stop sidelink packet transmission/reception with the
         impacted Destination ID(s)
          In some of the implementations, the UE may stop the
          sidelink packet exchange with one specific Destination ID
          (e.g., the Destination ID associated with (at least) one
          sidelink broadcast service or (at least) one sidelink group-
          cast service) if the sidelink RRC configuration happens to
          the Destination ID. In addition, the UE may also report the
          'Sidelink RRC Configuration Failure Report' (and the
          impacted Destination ID) to the serving cell through uplink
          control signaling
 (2) (Partial success design) In some implementations, the UE
    would update the sidelink RRC Configurations of the sidelink radio
    bearers by accepting the (valid part of) the sidelink RRC
    Configuration received through dedicated control signaling. Here,
    the valid part of the sidelink RRC Configuration means the part of
    received sidelink RRC Configuration which is configurable to the
    Rx UE itself.
 (3) In some of the implementations, the UE may also provide the
    sidelink RRC configuration failure report to the impacted UE,
    which one (or more than one) sidelink radio bearer fails because of
    implementing sidelink RRC configuration received from the
    serving cell, (e.g., if partial failure design is implemented between
    the paired UE and the PC5 RRC connection are still kept). Under
    some conditions, the UE (which transmits the sidelink RRC
    configuration failure report) may release the impacted sidelink
    radio bearer(s) before the sidelink RRC configuration failure report
    is sent. Then, the UE which receives the sidelink RRC
    configuration failure report from its paired UE may release the
    corresponding impacted sidelink radio bearers after receiving the
    sidelink RRC configuration failure report.

FIG. 6 illustrates a process 600 for handling a sidelink failure event according to an implementation of the present disclosure. In action 612, the UE 606 receives a first message including a sidelink RRC configuration associated with a target cell 602 from a source cell 604. The source cell 604 may be the current serving cell of the UE 606. In action 614, the UE 606 may determine that a sidelink failure event associated with an associated sidelink destination UE 608 occurs. In action 616, the UE 606 may perform a handover procedure to switch from the source cell 604 to the target cell 602. In action 618, the UE 606 may transmit a sidelink failure report indicating the sidelink failure event to the target cell 602.

In one implementation, during the handover procedure, the source cell 604 may communicate with the target cell 602. For example, the source cell 604 may provide information of the UE 606 to the target cell 602. The target cell 602 may transmit configuration parameters (e.g., parameters related to sidelink radio configurations) to the source cell 604, and the source cell 604 may transmit the configuration parameters to the UE 606 via the first message. Please note the SL RRC configuration message in action 612 may be transmitted via one UE-specific DL RRC signaling (e.g., RRCReconfiguraion message with 'reconfigurationwith- sync' IE, which is provided for connected UE mobility event). Please also note, in some implementations, the UE 606 may also have provided the information/configuration related to the sidelink destination UE 608 (e.g., the (Layer-2) Destination ID, cast types, QoS information, or other AS layer configurations associated with the sidelink destination UE 608) to the source cell 604 before action 612 (e.g., via the sidelinkUEInformationNR or sidelinkUEInformation-EUTRA transmitted in a UL UE-specific RRC signaling from UE 606 to the source cell 604). Moreover, after receiving the sidelinkUEInformationNR/sidelinkUEInformationEUTRA from the UE 606, the source cell 604 may forward the sidelinkUEInformationNR/sidelinkUEInformationEUTRA to the target cell 602 through backhaul connection (e.g., via a handoverpreparationInformation message delivery procedure before the action 612). Therefore, the target cell 602 could provide sidelink radio configurations (e.g., sidelink radio configurations associated with the sidelink destination UE 608) to the UE 606 through the forwarding of the source cell 604. In addition, after the handover procedure in action 616, the target cell 602 could also identify the SL failure report transmitted by the UE 606 in action 618.

During the process 600, in some implementations, the UE 606 may act as a relay UE, and the sidelink destination UE 608 may act as a remote UE. The base station (e.g., the base station which configures the source cell 604) may control the sidelink radio configuration and sidelink resource allocation of the remote UE (the sidelink destination UE 608) via the relay UE (the UE 606). In one implementation, after receiving the first message in action 612, the UE 606 may transmit a second message including the sidelink RRC configuration associated with the target cell 602 to the sidelink destination UE 608. The second message may be transmitted via a PC5 RRC connection between the UE 606 and the sidelink destination UE 608.

There may be a sidelink failure event regarding the transmission of the second message from the UE 606 to the sidelink destination UE 608. The sidelink failure event may be a sidelink RRC reconfiguration failure event for a PC5 RRC connection between the UE 606 and the associated sidelink destination UE 608. For example, the sidelink destination UE 608 may successfully receive the sidelink RRC configuration but fail to apply the sidelink RRC reconfiguration. In one implementation, the sidelink destination UE 608 may transmit a sidelink failure indication to the UE 606 to indicate the sidelink RRC reconfiguration failure. The UE 606 may determine that the sidelink failure event associated with the sidelink destination UE 608 occurs in action 614 based on the sidelink failure indication received from the sidelink destination UE 608. Then, the UE 606 may report this sidelink failure event to the target cell 602 via the SL failure report in action 618 (e.g., by attaching the (Layer-2) Destination ID of the UE 608 and a failure cause of '(sidelink) reconfiguration failure' in the SL failure report in action 618).

The sidelink failure event may be a sidelink radio link failure event for a PC5 RRC connection between the UE 606 and the associated sidelink destination UE 608. For example, the UE 606 may consider sidelink radio link failure event with the sidelink destination UE 608 to be detected when (at least) one of the following events happens:

(a) The UE 606 may fail to transmit the sidelink RRC signaling to the sidelink destination UE 608. For example, in some implementations, the sidelink RLC entity (which is configured on a sidelink radio bearer in the UE 606 for sidelink packet exchange with the sidelink destination UE 608) may provide an indication to the RRC entity of the UE 606 that the maximum number of (ARQ) re-transmissions for the sidelink destination UE 608 has been reached (to a pre-defined upper-bound threshold). Then, the UE 606 (e.g., the RRC entity in the UE 606) may consider that the sidelink radio link failure event has been detected for the sidelink destination UE 608.

(b) The sidelink radio link failure may occur due to channel quality issues on the air link between the UE 606 and the sidelink destination UE 608. For example, in some implementations, the sidelink specific MAC (function/entity) in the UE 606 may be informed (by the lower layers) that the maximum number of consecutive Hybrid Automatic Repeat reQuest (HARD) Discontinuous Transmission (DTX) for sidelink packet (re)transmission to the sidelink destination UE 608 has been reached. This event may happen due to the unstable channel quality between the UE 606 and the sidelink destination UE 608.

(c) In one implementation, the UE 606 may determine the sidelink radio link failure based on predetermined conditions/parameters, such as an expiry of a timer related to the transmission of the second message. For example, UE 606 may start to count a sidelink timer T400 to zero when the UE 606 transmits the second message (e.g., one RRCReconfigurationsidelink message which conveys sidelink radio configurations to the sidelink destination UE 608 for the PC5 RRC connection (re)configuration between the UE 606 and the sidelink destination UE 608) to the sidelink destination UE 608. Please also note, the initial value of T400 may be decided based on sidelink pre-configuration/broadcasting sidelink SIB from serving RAN/UE-specific control signaling from the serving cell. Then, the UE 606 may stop T400 when the UE 606 receives ACK/NACK message from the UE 608 (e.g., RRCReconfigurationCompleteSidelinkIRRCReconfigurationFailureSidelink message). In contrast, the UE may consider sidelink radio link failure event for the UE 608 has been detected while T400 expires but the UE 606 does not receive any response message from the UE 608.

(d) In one implementation, the UE 606 may determine the sidelink radio link failure upon integrity check failure indication from the sidelink PDCP entity, which is configured on a sidelink radio bearer in the UE 606 for sidelink packet exchange with the sidelink destination UE 608.

Based on the triggering events above, the UE 606 may determine that the sidelink failure event associated with the sidelink destination UE 608 occurs in action 614 by the UE 606 itself.

Please note, in some scenarios, the UE 606 may release the PC5 RRC connection with the sidelink destination UE 608 (and release/discard/remove the sidelink radio configurations associated with the sidelink destination UE 608) when the UE 606 considers the sidelink radio link failure event for the sidelink destination UE 608 has been detected. However, please also note, the UE 606 may also receive (sidelink) full configuration instruction from the serving cell (e.g., the $1^{st}$ message in action 612) (before or after) the sidelink radio link failure event happens. Under such condition, in some implementations, the UE 606 may just release the PC5-RRC connection with the sidelink destination UE 608 without being impacted by the (sidelink) full configuration (and so the UE 606 may still provide the SL failure report to the target cell 602 in action 618). In addition, the UE 606 may ignore the (sidelink) full configuration instruction in the $1^{st}$ message even if there are any new sidelink radio configurations (associated with the sidelink destination UE 608) provided in the $1^{st}$ message in action 612.

In one implementation, the handover procedure in action 616 may be an intra-RAT handover procedure. Both the source cell 604 and the target cell 602 may belong to either an E-UTRAN or an NR-RAN.

In one implementation, the handover procedure in action 616 may be an inter-RAT handover procedure. One of the source cell 604 and the target cell 602 may belong to an E-UTRAN, and the other of the source cell 604 and the target cell 602 may belong to an NR-RAN. For example, the target cell 602 may belong to the E-UTRAN, and signaling to the target cell 602 may follow the E-UTRAN protocol. On the other hand, the sidelink failure report in action 618 may follow the NR protocol. An inter-RAT transceiver or an inter-RAT (signlaing) container may be provided such that the target cell 602 can accommodate the sidelink failure report.

In one implementation, the sidelink failure report in action 618 may include a failure cause and an ID of the sidelink destination UE 608 (also referred to as destination UE ID). The failure cause may indicate one of 'sidelink RRC reconfiguration failure' and 'sidelink radio link failure'. For example, the failure cause indicates 'sidelink (RRC) reconfiguration failure' when the sidelink failure event is a sidelink RRC reconfiguration failure event, whereas the failure cause indicates 'sidelink radio link failure' when the sidelink failure event is a sidelink radio link failure event.

In one implementation, the sidelink failure report in action 618 may be transmitted via an RRC reconfiguration complete message, which may be the last step of the handover procedure in action 616. In some other implementations, the sidelink failure report in action 618 may be transmitted to the target cell 602 after the transmission of the RRC reconfiguration complete message.

In one implementation, the sidelink failure report in action 618 may be transmitted via NR RRC signaling to the target cell 602 in a case that the target cell 602 is an NR cell, whereas the sidelink failure report in action 618 may be transmitted via E-UTRA RRC signaling in a case that the target cell 602 is an E-UTRA cell.

In one implementation, in action 612, the UE 606 may receive a full configuration indicator in the first message (e.g., the full configuration instructed by the target cell 602). The UE 606 may determine to release a dedicated sidelink radio configuration associated with the sidelink destination UE 608 in a case that the dedicated sidelink radio configuration is configured by a serving RAN (which may be the source cell 604) through UE-specific dedicated control signaling before the reception of the first message. The UE 606 may determine not to release the dedicated sidelink radio configuration associated with the sidelink destination UE 608 in a case that the dedicated sidelink radio configuration is not configured by the serving RAN (e.g., through UE-specific dedicated control signaling and/or broadcast system information) before the reception of the first message. The dedicated sidelink radio configuration includes a sidelink radio configuration for the UE 606 to implement at least one of an NR sidelink communication service and an LTE V2X sidelink communication service. However, in some implementations, the UE 606 may still transmit the SL failure report associated with the sidelink destination UE 608 no matter whether full configuration is instructed by the target cell 602 in action 612 and no matter whether any new sidelink radio configuration (associated with the sidelink destination UE 608) is provided by the target cell 602. In other words, the UE 606 may not release the SL failure report while the UE 606 is implementing full configuration (on Uu interface/PC5 interface). In contrast, in some additional implementations, the UE 606 may not implement the SL failure report associated with the sidelink destination UE 608 to the target cell 602 if the PC5 RRC connection associated with the sidelink destination UE 608 would be released by the (sidelink) full configuration instruction in the $1^{st}$ message in action 612 (e.g., when the (sidelink) full configuration is instructed by the target cell 602 in the action 612) and new sidelink radio configurations associated with the sidelink destination UE 608 may or may not be transmitted jointly in the $1^{st}$ message in action 612.

Figure 7:
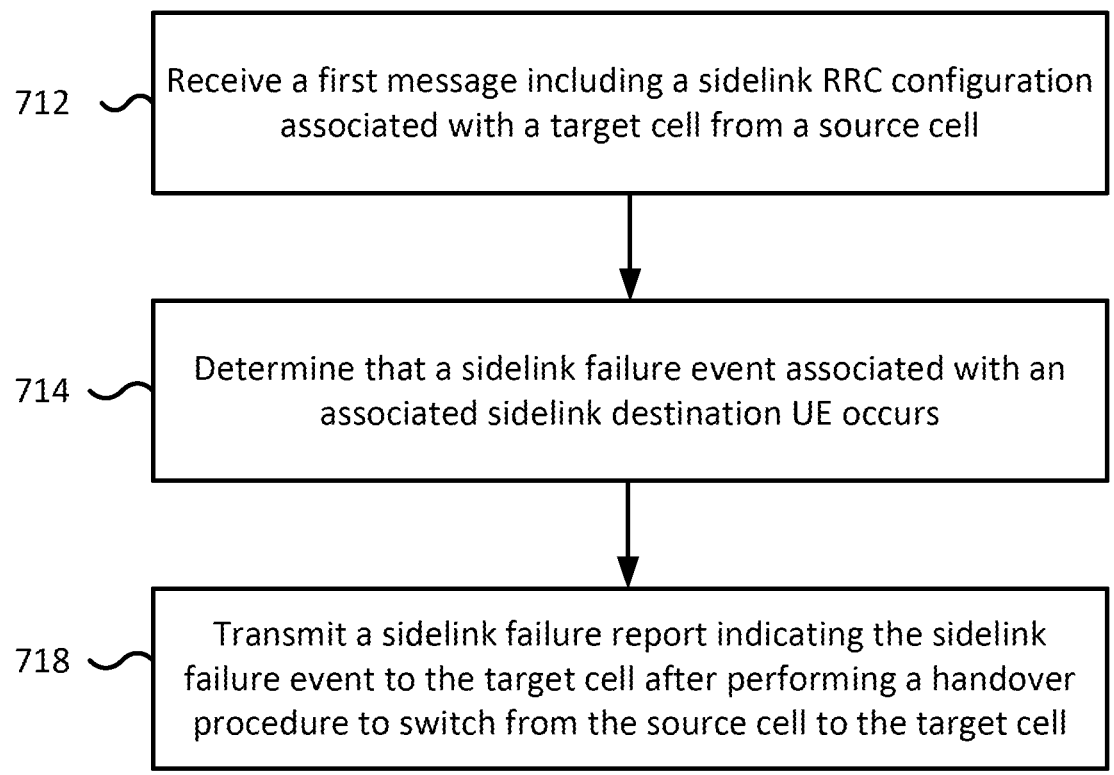
FIG. 7 illustrates a method performed by a UE for sidelink failure management according to an implementation of the present disclosure.

FIG. 7 illustrates a method 700 performed by a UE for sidelink failure management according to an implementation of the present disclosure. In action 712, the UE receives a first message including a sidelink RRC configuration (e.g., SIB12/SIB13 of the target cell or SL-ConfigDedicatedNR/SL-ConfigDedicatedEUTRA configured by the target cell for the UE) associated with a target cell from a source cell. In action 714, the UE determines that a sidelink failure event associated with an associated sidelink destination UE occurs. In action 718, the UE transmits a sidelink failure report indicating the sidelink failure event to the target cell after performing a handover procedure to switch from the source cell to the target cell. Actions 712, 714, and 718 may correspond to actions 612, 614, and 618 illustrated in FIG. 6.

Figure 8:
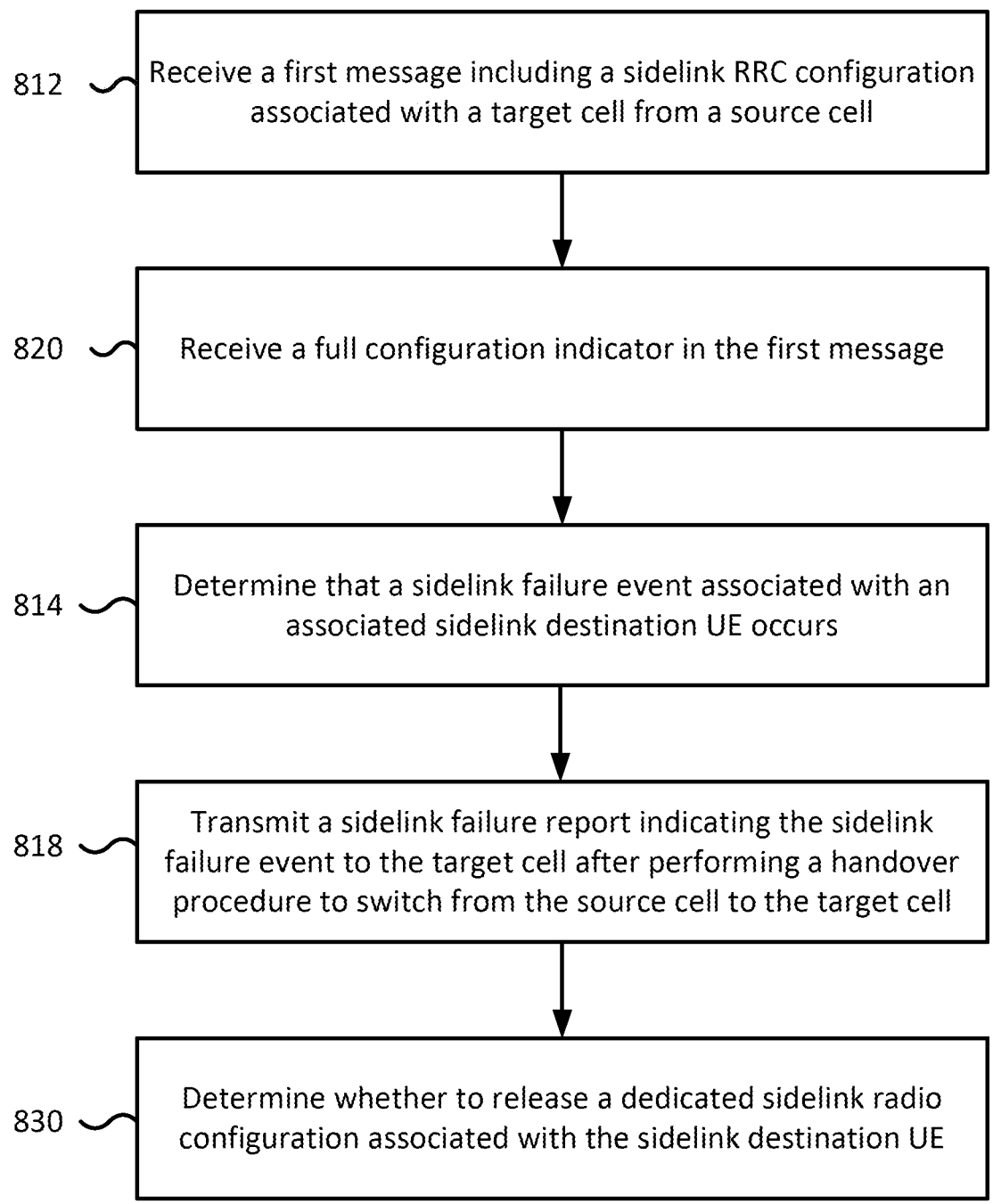
FIG. 8 illustrates a method performed by a UE for sidelink failure management according to another implementation of the present disclosure.

FIG. 8 illustrates a method 800 performed by a UE for sidelink failure management according to another implementation of the present disclosure. Actions 812, 814, and 818 may correspond to actions 712, 714, and 718 illustrated in FIG. 7. In action 820, the UE receives a full configuration indicator in the first message. In action 830, the UE determines whether to release a dedicated sidelink radio configuration associated with the sidelink destination UE. In one implementation, the UE may determine to release a dedicated sidelink radio configuration associated with the sidelink destination UE in a case that the dedicated sidelink radio configuration is configured by a serving RAN (e.g., through UE-specific dedicated control signaling before the reception of the first message). In one implementation, the UE may determine not to release the dedicated sidelink radio configuration (associated with the sidelink destination UE) in a case that the dedicated sidelink radio configuration is not configured by the serving RAN (e.g., through UE-specific dedicated control signaling before the reception of the first message). In this condition, the dedicated sidelink radio configuration may be provided by the paired UE (e.g., the sidelink destination UE) in the PC5-RRC connection via PC5-RRC signaling(s), may be decided by sidelink pre-configuration stored by the UE itself, or may be decided by broadcast sidelink system information (e.g., SIB12/SIB13) from the serving RAN.

Implementation #2-2 Sidelink AS Configuration Failure Event Caused by Broadcast Control Signaling Implementation #2-2 addresses the sidelink AS configuration failure when the UE receives the sidelink AS configuration through broadcast control signaling (e.g., system information specific to LTE or NR V2X services). Table 11 lists detailed implementations of Implementation #2-2, which is related to sidelink AS configuration failure when the sidelink AS configuration is obtained by reading the system information from the corresponding cell.

TABLE 11

| | | Implementation#2-2 |
|---|---|---|
| Problem formulation | (1) | The implementation#2-2 may include/cover the following Case#1/Case#2:<br>Case#1: The UE may obtain sidelink AS configuration by reading the broadcast system information from the serving cell (e.g., the Primary cell or camped-on cell).<br>Case#2: The UE may also obtain sidelink AS configuration by reading the broadcast system information from a non-serving cell (e.g., the target non-serving cell is operating on a sidelink frequency carrier (which the UE has interest in accessing) and the non-serving cell supports (LTE/NR) sidelink operation by broadcasting a (LTE/NR) sidelink AS configuration through system information delivery). |

TABLE 11-continued

Implementation#2-2

| | | |
|---|---|---|
| | (2) | (Cross-RAT scenario) By considering the radio access technologies in Uu/PC5 interface:<br>a. One NR UE (e.g., a UE whose RRC entity is under either NR RRC connected state/NR RRC inactive state or NR RRC idle state) may receive an LTE (and/or) NR sidelink AS configuration from a serving NR cell (e.g., through broadcast system information or through an SI on-demand procedure in NR RRC protocols).<br>b. One LTE UE (e.g., a UE whose RRC entity is under either LTE RRC connected state/LTE RRC inactive state or LTE RRC idle state) may receive an LTE (and/or) NR sidelink AS configuration from a serving LTE cell (e.g., through broadcast system information in LTE RRC protocols).<br>Then, the UE would configure the (LTE/NR) PC5 interface based on the received (LTE/NR) broadcast message. The implementation#1 is provided for an (LTE/NR) RRC inactive/idle UE. However, the implementation may not be limited by the RRC state of the UE. |
| | (3) | One UE may be associated with one or more than one (Layer-2) Destination ID(s). Then, through one (or more than one) broadcast system information, the UE may receive one common sidelink AS configuration and the common sidelink AS configuration may be indicated for application to all of the associated Destination ID(s). In some other implementations, the UE may receive more than one sidelink AS configuration and each sidelink AS configuration may be indicated for application to a subset of the associated Destination ID(s). |
| | (4) | The sidelink AS configuration transmitted in the system information may be associated with one validity area.<br>In some implementations, the validity area may be configured based on the sidelink zone-configuration (e.g., through the assistance of Global Navigation Satellite System (GNSS) information). In some other implementations, the validity area may be configured with one specific validity area Identity to differentiate the different validity areas for different sidelink AS configurations. In some implementations, one validity area may be composed of the cell identity, RAN notification area identity, or tracking area identity in one specific Public Land Mobile Network (PLMN) (or cross multiple PLMNs).<br>When one sidelink AS configuration broadcast in system information is associated with one validity area, then the UE may store the sidelink AS configuration and the sidelink AS configuration is valid while the UE is within the configured validity area (then, the UE may apply the stored (and valid) sidelink AS configuration while the UE is in RRC inactive/idle state). |
| Uu interface | (1) | In some of the implementations (e.g., the UE obtains the sidelink AS configuration by reading the system information from the camped-on cell (However, the UE may also obtain the sidelink AS configuration from other cells, such as serving cell/Primary cell/special cell/secondary cell), the UE may transmit the 'Sidelink AS Configuration Failure Report' to the serving cell while the sidelink AS configuration failure happens after the UE configures the AS functions of the (LTE/NR) PC5 interface (e.g., the sidelink radio bearer configuration) based on the received system information.<br>a. One 'Sidelink RRC Configuration Failure' IE may be configured in the Information Element as follows: "UEAssistanceInformation" (e.g., "UEAssistanceInformationNR" "UEAssistanceInformationEUTRA") or 'SidelinkUEInformation' (e.g., SidelinkUEInformationNR' or SidelinkUEInformationEUTRA).<br>   i. Then, the UE may set Sidelink RRC Configuration Failure = true to indicate the sidelink RRC configuration failure event happens.<br>   ii. In some implementations, the UE may further indicate in which interface the failure event happens, such as 'sidelink AS Configuration Failure in LTE PC5 interface' or 'sidelink AS Configuration Failure in NR PC5 interface'.<br>   iii. In some other implementations, one additional cause IE may also be configured to indicate the cause of the sidelink RRC configuration failure event (e.g., 'sidelink AS configuration from system information is not applicable', 'sidelink AS configuration through PC5 RRC signaling is not applicable'). |

TABLE 11-continued

| Implementation#2-2 |
|---|

Figure 9A:
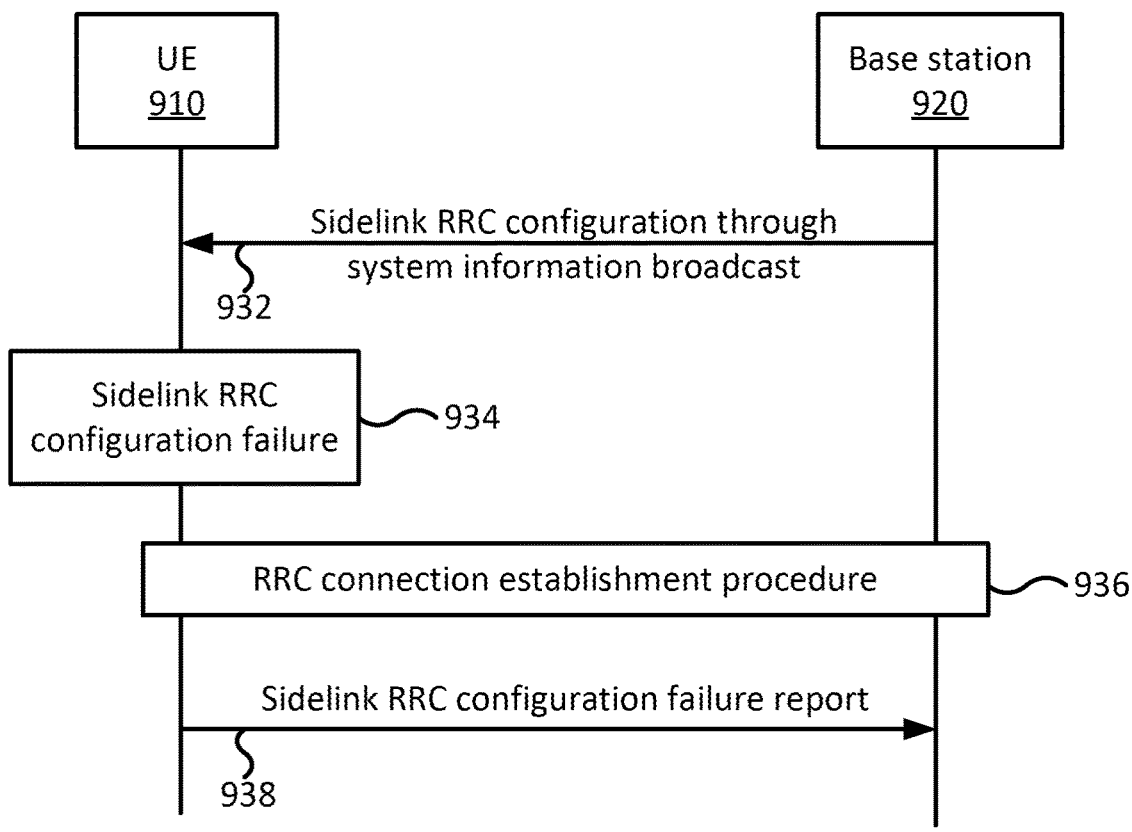
FIG. 9A illustrates a procedure for initiating an RRC establishment procedure to report a sidelink AS configuration failure event according to an implementation of the present disclosure.
Figure 9B:
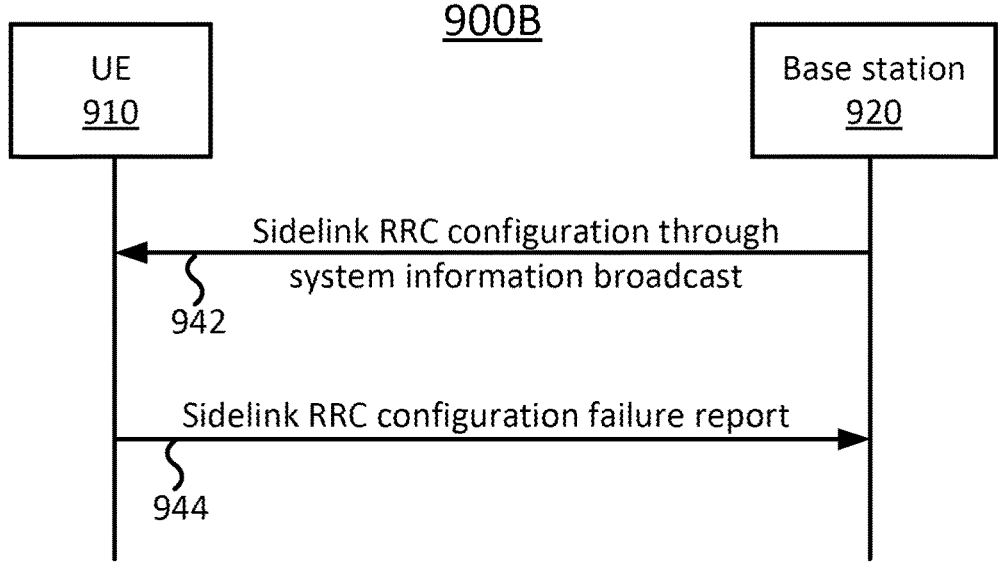
FIG. 9B illustrates a procedure for transmitting a sidelink AS configuration failure report to a serving RAN according to an implementation of the present disclosure.

- (2)        b.    The 'Sidelink AS Configuration Failure Report' IE may be associated with one or more than one Destination (Layer-2) ID(s) with which the corresponding UE connects in the (LTE/NR) PC5 interface.
- (2) In some implementations, the UE in (LTE/NR) RRC inactive/idle state may be triggered to initiate the RRC connection with the RAN to report the sidelink AS configuration failure event. FIG. 9A illustrates a procedure 900A for initiating an RRC establishment procedure to report a sidelink AS configuration failure event according to an implementation of the present disclosure. The UE 910 may be in the (LTE/NR) RRC inactive/idle state. In action 932, the base station 920 (e.g., an gNB) transmits a sidelink RRC configuration through system information broadcast to the UE 910. In action 934, the UE 910 determines a sidelink RRC configuration failure occurs. In action 936, the UE 910 in the RRC inactive/idle state may be triggered to initiate the RRC establishment procedure. In action 938, the UE transmits a sidelink RRC configuration failure report to the base station 920.
  - a. In some implementations, both case#1 and case#2 may trigger the UE to initiate RRC connection (or resume the RRC connection if the UE is in RRC inactive state) with the RAN to report the Sidelink AS Configuration Failure Report. In some other implementations, only case#1 may trigger the UE to initiate RRC connection for the Sidelink AS Configuration Failure Reporting.
  - b. In some other implementations, a UE in (LTE/NR) RRC inactive/idle state may not be triggered (by the sidelink AS configuration failure event) to initiate the RRC Connection Establishment procedure (to connect with the Radio Access Network/Core Network) directly to report the sidelink RRC configuration failure event to the cellular network. Instead, the UE would record the sidelink AS configuration failure event and maintain its (LTE/NR) RRC states (in other words, the UE would not be triggered to change RRC states in the (LTE/NR) Uu interface because of the sidelink AS configuration failure event in the (LTE/NR) PC5 interface). The UE would transmit the Sidelink AS Configuration Failure Report to the RAN (or CN) the next time the UE connects with the RAN/CN (triggered by other events).
  - c. In case#1, an (LTE/NR) RRC inactive/idle UE may consider a cell as 'barred' for a time period (e.g., 300 seconds) if the UE camps on a cell and broadcasts a sidelink AS Configuration which causes the sidelink AS configuration failure event in the UE side.
  - d. In case#2, the UE may skip the corresponding cell (or consider the corresponding cell as 'barred') and UE may try to select another cell (to read the system information of the selected cell) on the target non-serving cell. In some implementations, the UE may consider the corresponding cell as 'low priority' (for a time period) in a cell (re)selection procedure if the UE camps on a cell and broadcasts a sidelink AS configuration which causes the sidelink AS configuration failure event in the UE side.
  - e. In some implementations, in case#1/2, the UE may not be allowed to apply a sidelink pre-configuration after the sidelink AS configuration failure event happens. In other implementations, in case#1/2, the UE may be allowed to apply a sidelink pre-configuration after the sidelink AS configuration failure event happens.
- (3) An (LTE/NR) RRC Connected UE may report the sidelink AS configuration failure event to the serving cell directly (e.g., by requesting an UL grant and then report the sidelink AS configuration failure event in the UEAssistanceInformation directly message). FIG. 9B illustrates a procedure 900B for transmitting a sidelink AS configuration failure report to a serving RAN according to an implementation of the present disclosure. The UE 910 may be in the (LTE/NR) RRC connected state. In action 942, the base station 920 (e.g., a gNB) transmits a sidelink RRC configuration through system information broadcast to the UE 910. In action 944, the UE transmits a sidelink RRC configuration failure report to the base station 920.
  - a. (To case#2) In some of the implementations, a (LTE/NR) UE may directly transmit the Sidelink AS Configuration Failure Report of another (non-serving) sidelink component carrier to the serving cell (the serving cell operating on another component carrier which is different with the target (non-serving) sidelink component carrier).

TABLE 11-continued

| | | Implementation#2-2 |
|---|---|---|
| | b. | In some implementations, the UE may transmit the Sidelink AS Configuration Failure Report (on another sidelink component carrier) to the serving cell only when the UE obtains the information about the target sidelink component carrier (and the target non-serving cell) through the serving cell. In this implementation, the cell identity (e.g., the cellidentity, which is unique in the selected/registered PLMN) or component carrier information (e.g., absolute radio-frequency channel number (ARFCN) for NR/E-UTRA) may also be included in the Sidelink AS Configuration Failure Report. |
| | c. | In some implementations, the UE may not transmit the Sidelink AS Configuration Failure Report if the sidelink AS configuration is obtained from the system information of a non-serving cell. |
| | d. | In some implementations, in case#1/2, the UE may not be allowed to apply sidelink per-configuration after the sidelink RRC configuration failure event happens. In some other implementations, in case#1/2, the UE may be allowed to apply sidelink pre-configuration after the sidelink RRC configuration failure event happens. |
| | (4) | In some implementations, the UE may not transmit the Sidelink AS Configuration Failure Report to the serving cell directly. Instead, the Sidelink AS Configuration Failure Report may be recorded as a log file in the UE side (e.g., a log file). Then, after the UE connects with the upper layers (e.g., after the UE connects with the Non-Access-Stratum (NAS) layer or the V2X application layer), the upper layers may instruct the UE to report the log file (through the forwarding of the serving cell). After receiving the instruction, the UE would transmit the Sidelink AS Configuration Failure Report to the upper layers. Moreover, the physical location or timing information of the Sidelink AS Configuration instance(s) may also be transmitted with the log file to the upper layers. |
| PC5 interface | (1) | (Sidelink AS Configuration with validity area configuration) In some implementations, the UE may release the stored sidelink AS configuration (while the stored Sidelink AS Configuration is obtained from other cells and the UE is still located in the validity area associated with the stored Sidelink AS Configuration) if the sidelink AS configuration failure event happens. |
| | (2) | In Implementation#2, a partial release approach may be applied such that, after the sidelink AS configuration failure event happens, the UE may: |
| | | a. Release the PC5 RRC connection of the impacted Destination(s) |
| | | To the associated Destination ID(s) to which the sidelink AS configuration failure happens, the UE may not continue using the configuration used prior to the reception of the system information message (e.g., SysteminformationV2X). Instead the UE may release, to the unicast service with the impacted Destination IDs, the PC5 RRC connections which include the impacted sidelink Destination(s). |
| | | b. Release the impacted sidelink radio bearer of the impacted Destination(s) |
| | | In some implementations, for one associated Destination ID, it is also possible that only a subset of the sidelink radio bearers are impacted by the sidelink AS configuration failure event. For example, the UE may have existing sidelink radio bearers (SLRB#1~5) with one associated Destination ID and the SLRB#3 and SLRB#5 are impacted by the sidelink AS configuration failure event caused by reading system information. Then, the UE may only release the SLRB#3, and SLRB#5 with the associated Destination ID. In other words, the existing SLRB#1/2/4 are still kept and the PC5 RRC connection may still be kept based on the existing SLRB#1/2/4. |
| | | c. Stop sidelink packet transmission/reception with the impacted Destination ID(s). In some of implementations, the UE may stop the sidelink packet exchange with one specific Destination ID (e.g., the Destination ID associated with (at least) one sidelink broadcast service or (at least) one sidelink group-east service) if the sidelink AS configuration happens to the Destination ID. |
| | (3) | (Partial success design) In addition, to other sidelink radio bearers, the UE would modify the configurations of these sidelink radio bearers by accepting the (valid part of) the sidelink AS Configuration received from the system information. |

Figure 10:
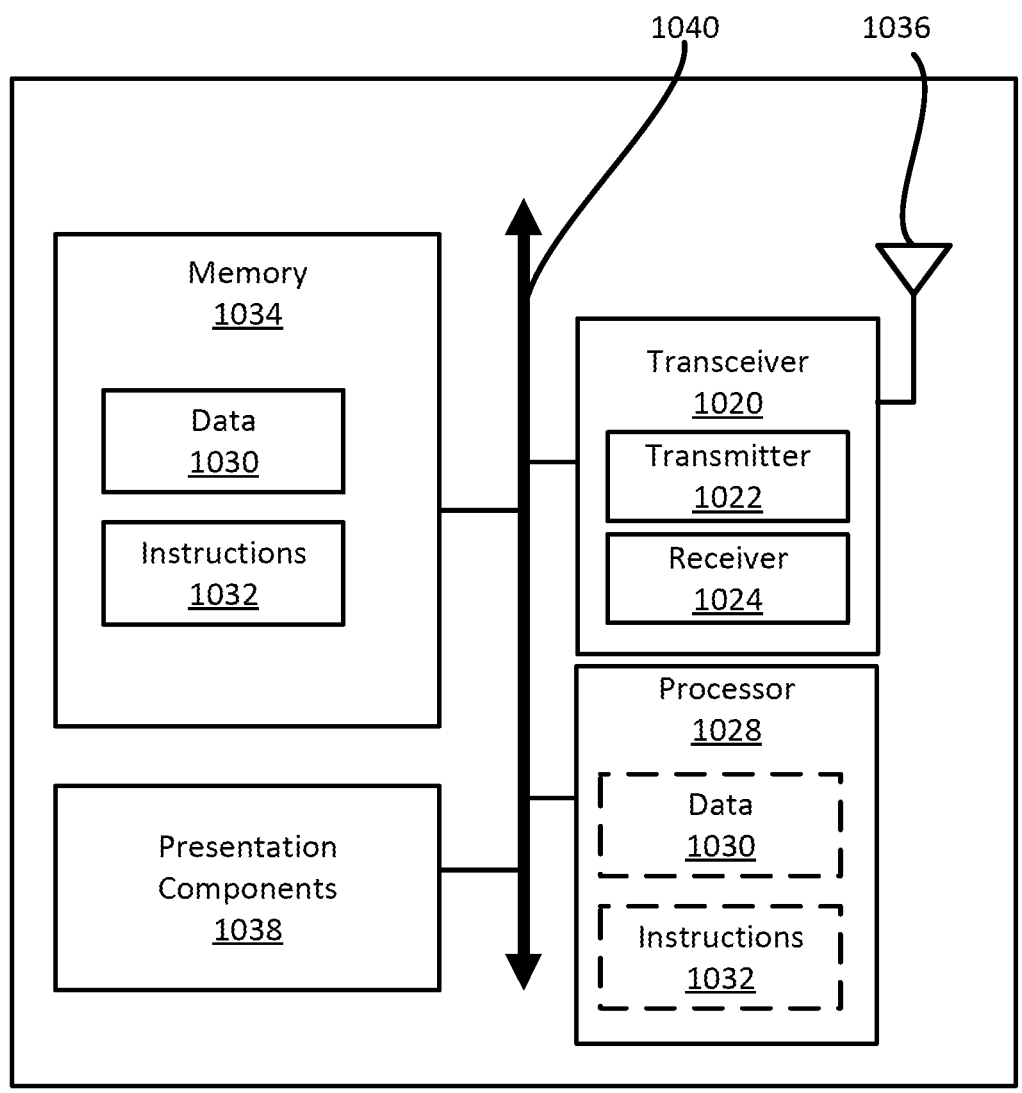
FIG. 10 is a block diagram illustrating a node for wireless communication according to an implementation of the present disclosure.

FIG. 10 is a block diagram illustrating a node 1000 for wireless communication according to an implementation of the present disclosure. As illustrated in FIG. 10, a node 1000 may include a transceiver 1020, a processor 1028, a memory 1034, one or more presentation components 1038, and at least one antenna 1036. The node 1000 may also include a Radio Frequency (RF) spectrum band module, a BS communications module, a network communications module, and a system communications management module, Input/Output (I/O) ports, I/O components, and a power supply (not illustrated in FIG. 10).

Each of the components may directly or indirectly communicate with each other over one or more buses 1040. The node 1000 may be a UE or a BS that performs various functions disclosed with reference to FIGS. 1 through 9B.

The transceiver 1020 has a transmitter 1022 (e.g., transmitting/transmission circuitry) and a receiver 1024 (e.g., receiving/reception circuitry) and may be configured to transmit and/or receive time and/or frequency resource partitioning information. The transceiver 1020 may be configured to transmit in different types of subframes and slots including but not limited to usable, non-usable and flexibly usable subframes and slot formats. The transceiver 1020 may be configured to receive data and control channels.

The node 1000 may include a variety of computer-readable media. Computer-readable media may be any available media that may be accessed by the node 1000 and include both volatile and non-volatile media, removable and non-removable media.

The computer-readable media may include computer storage media and communication media. Computer storage media include both volatile and non-volatile, removable and non-removable media implemented in any method or technology for storage of information such as computer-readable instructions, data structures, program modules or data. Computer storage media include RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not include a propagated data signal. Communication media typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the previously listed components should also be included within the scope of computer-readable media.

The memory 1034 may include computer-storage media in the form of volatile and/or non-volatile memory. The memory 1034 may be removable, non-removable, or a combination thereof. Example memory includes solid-state memory, hard drives, optical-disc drives, etc. As illustrated in FIG. 10, the memory 1034 may store computer-readable, computer-executable instructions 1032 (e.g., software codes) that are configured to cause the processor 1028 to perform various disclosed functions, for example, with reference to FIGS. 1 through 9B. Alternatively, the instructions 1032 may not be directly executable by the processor 1028 but be configured to cause the node 1000 (e.g., when compiled and executed) to perform various disclosed functions.

The processor 1028 (e.g., having processing circuitry) may include an intelligent hardware device, e.g., a Central Processing Unit (CPU), a microcontroller, an ASIC, etc. The processor 1028 may include memory. The processor 1028 may process data 1030 and the instructions 1032 received from the memory 1034, and information transmitted and received via the transceiver 1020, the base band communications module, and/or the network communications module. The processor 1028 may also process information to be sent to the transceiver 1020 for transmission via the antenna 1036 to the network communications module for transmission to a core network.

One or more presentation components 1038 present data indications to a person or another device. Examples of presentation components 1038 include a display device, a speaker, a printing component, and a vibrating component, etc.

In view of the present disclosure, it is obvious that various techniques may be used for implementing the concepts in the present disclosure without departing from the scope of those concepts. Moreover, while the concepts have been disclosed with specific reference to certain implementations, a person of ordinary skill in the art will recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) for performing sidelink failure management, the UE comprising:
   at least one processor; and
   one or more non-transitory computer-readable media storing one or more computer-executable instructions that, when executed by the at least one processor, cause the UE to:
      determine that a sidelink failure event associated with a paired sidelink destination UE has occurred;
      receive, from a second cell, a message associated with a handover procedure, the message comprising a sidelink Radio Resource Control (RRC) configuration associated with a first cell; and
      transmit, to the first cell, a sidelink failure report indicating the sidelink failure event,
   wherein the UE determines that the sidelink failure event has occurred before being configured with the sidelink RRC configuration associated with the first cell.

2. The UE of claim 1,
   wherein the UE determines that the sidelink failure event has occurred also before receiving the sidelink RRC configuration associated with the first cell.

3. The UE of claim 1, wherein:
   the sidelink failure event comprises a sidelink RRC reconfiguration failure event for a PC5 RRC connection between the UE and the paired sidelink destination UE, and
   the sidelink failure report includes a cause of failure variable and a UE identifier (ID) associated with the paired sidelink destination UE, the cause of failure variable having a value that indicates the sidelink RRC reconfiguration failure as a source of sidelink failure.

4. The UE of claim 1, wherein:
the sidelink failure event comprises a sidelink RRC reconfiguration failure event for a PC5 RRC connection between the UE and the paired sidelink destination UE,
determining that the sidelink failure event associated with the paired sidelink destination UE has occurred comprises determining that the sidelink failure event has occurred after receiving a sidelink reconfiguration failure report from the paired sidelink destination UE via a PC5 interface, and
the sidelink failure report includes a cause of failure variable and a UE identifier (ID) associated with the paired sidelink destination UE, the cause of failure variable having a value that indicates the sidelink RRC reconfiguration failure as a source of sidelink failure.

5. The UE of claim 1, wherein:
the sidelink failure event comprises a sidelink radio link failure event for a PC5 RRC connection between the UE and the paired sidelink destination UE, and
the sidelink failure report includes a cause of failure variable and a UE identifier (ID) associated with the paired sidelink destination UE, the cause of failure variable having a value that indicates the radio link failure as a source of sidelink failure.

6. The UE of claim 1, wherein
the first cell, the sidelink RRC configuration comprises at least one of a UE-specific dedicated sidelink RRC configuration and a cell-specific common sidelink RRC configuration.

7. The UE of claim 1, wherein:
the message indicates to the UE to perform a handover procedure from the second cell to the first cell, and
transmitting, to the first cell, the sidelink failure report indicating the sidelink failure event comprises transmitting, to the first cell, the sidelink failure report after performing the handover procedure to switch from the second cell to the first cell based on the message.

8. The UE of claim 7, wherein transmitting, to the first cell, the sidelink failure report indicating the sidelink failure event further comprises transmitting, to the first cell, the sidelink failure report also after receiving, via broadcast, a system information block 12 (SIB 12) from the first cell, the SIB 12 indicating a sidelink operation associated with the first cell.

9. A method performed by a user equipment (UE) for sidelink failure management, the method comprising:
determining that a sidelink failure event associated with a paired sidelink destination UE has occurred;
receiving, from a second cell, a message associated with a handover procedure, the message comprising a sidelink Radio Resource Control (RRC) configuration associated with a first cell; and
transmitting, to the first cell, a sidelink failure report indicating the sidelink failure event,
wherein the UE determines that the sidelink failure event has occurred before being configured with the sidelink RRC configuration associated with the first cell.

10. The method of claim 9,
wherein the UE determines that the sidelink failure event has occurred also before receiving the sidelink RRC configuration associated with the first cell.

11. The method of claim 9, wherein:
the sidelink failure event comprises a sidelink RRC reconfiguration failure event for a PC5 RRC connection between the UE and the paired sidelink destination UE, and
the sidelink failure report includes a cause of failure variable and a UE identifier (ID) associated with the paired sidelink destination UE, the cause of failure variable having a value that indicates the sidelink RRC reconfiguration failure as a source of sidelink failure.

12. The method of claim 9, wherein:
the sidelink failure event comprises a sidelink RRC reconfiguration failure event for a PC5 RRC connection between the UE and the paired sidelink destination UE,
determining that the sidelink failure event associated with the paired sidelink destination UE has occurred comprises determining that the sidelink failure event has occurred after receiving a sidelink reconfiguration failure report from the paired sidelink destination UE via a PC5 interface, and
the sidelink failure report includes a cause of failure variable and a UE identifier (ID) associated with the paired sidelink destination UE, the cause of failure variable having a value that indicates the sidelink RRC reconfiguration failure as a source of sidelink failure.

13. The method of claim 9, wherein:
the sidelink failure event comprises a sidelink radio link failure event for a PC5 RRC connection between the UE and the paired sidelink destination UE, and
the sidelink failure report includes a cause of failure variable and a UE identifier (ID) associated with the paired sidelink destination UE, the cause of failure variable having a value that indicates the radio link failure as a source of sidelink failure.

14. The method of claim 9,
wherein the sidelink RRC configuration comprises at least one of a UE-specific dedicated sidelink RRC configuration and a cell-specific common sidelink RRC configuration.

15. The method of claim 9, wherein:
the message indicates to the UE to perform a handover procedure from the second cell to the first cell, and
transmitting, to the first cell, the sidelink failure report indicating the sidelink failure event comprises transmitting, to the first cell, the sidelink failure report after performing the handover procedure to switch from the second cell to the first cell based on the message.

16. The method of claim 15, wherein transmitting, to the first cell, the sidelink failure report indicating the sidelink failure event further comprises transmitting, to the first cell, the sidelink failure report also after receiving, via broadcast, a system information block 12 (SIB 12) from the first cell, the SIB 12 indicating a sidelink operation associated with the first cell.

* * * * *